Patented Jan. 9, 1923.

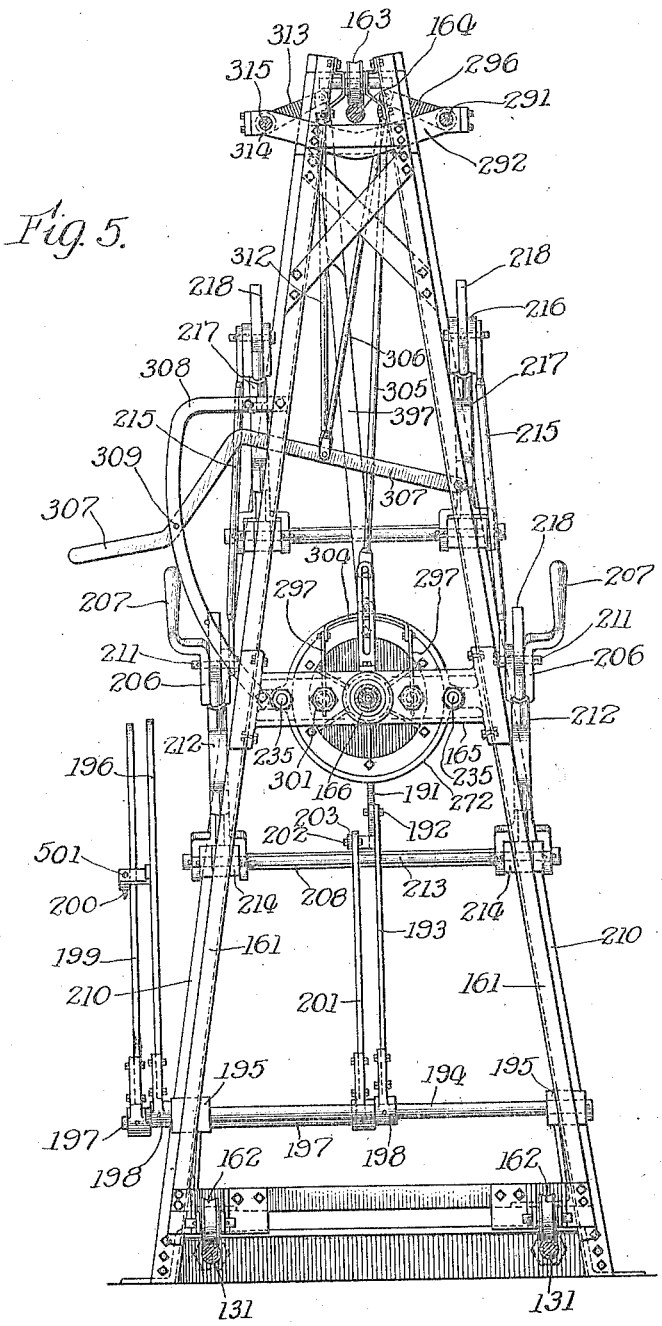

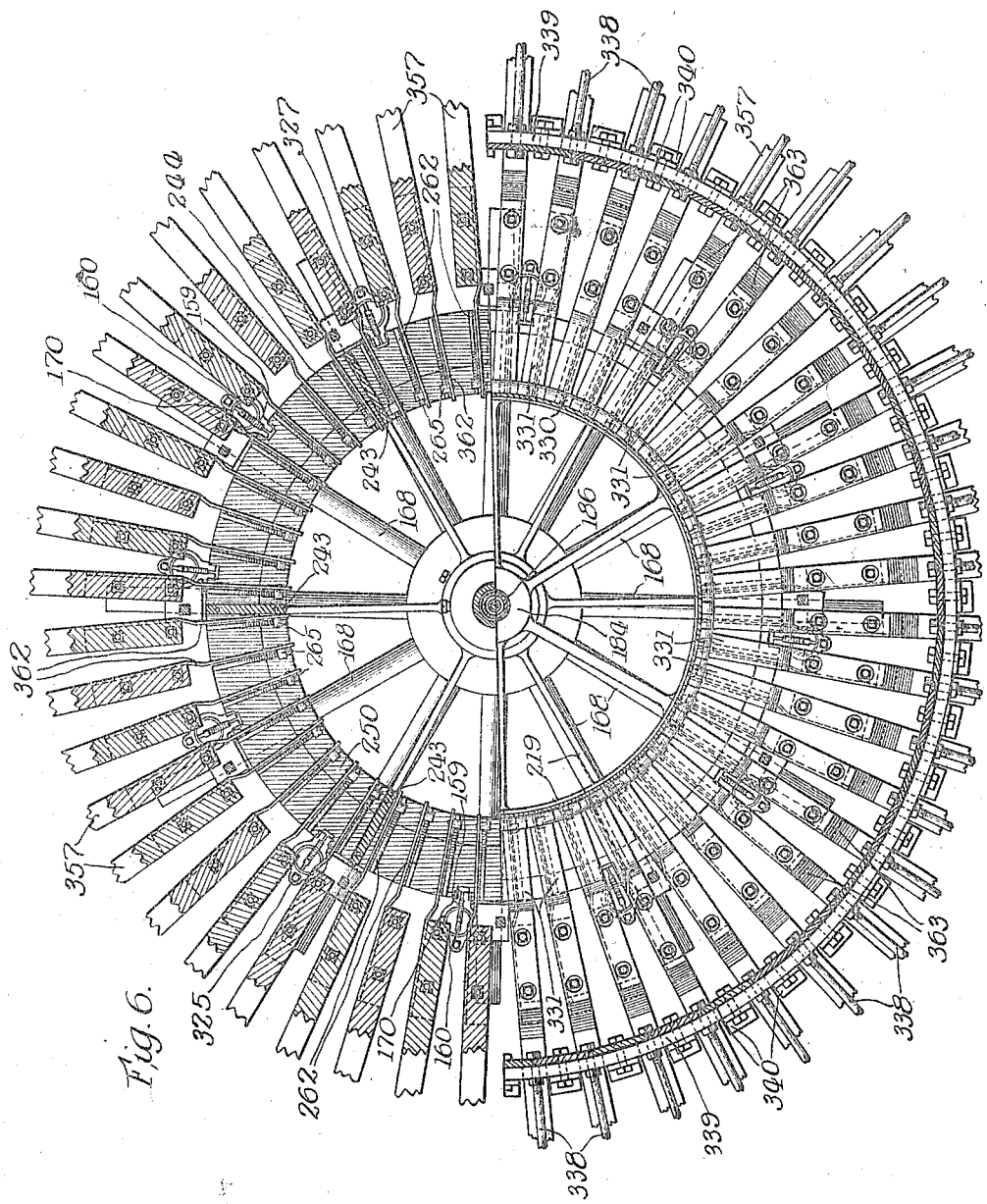

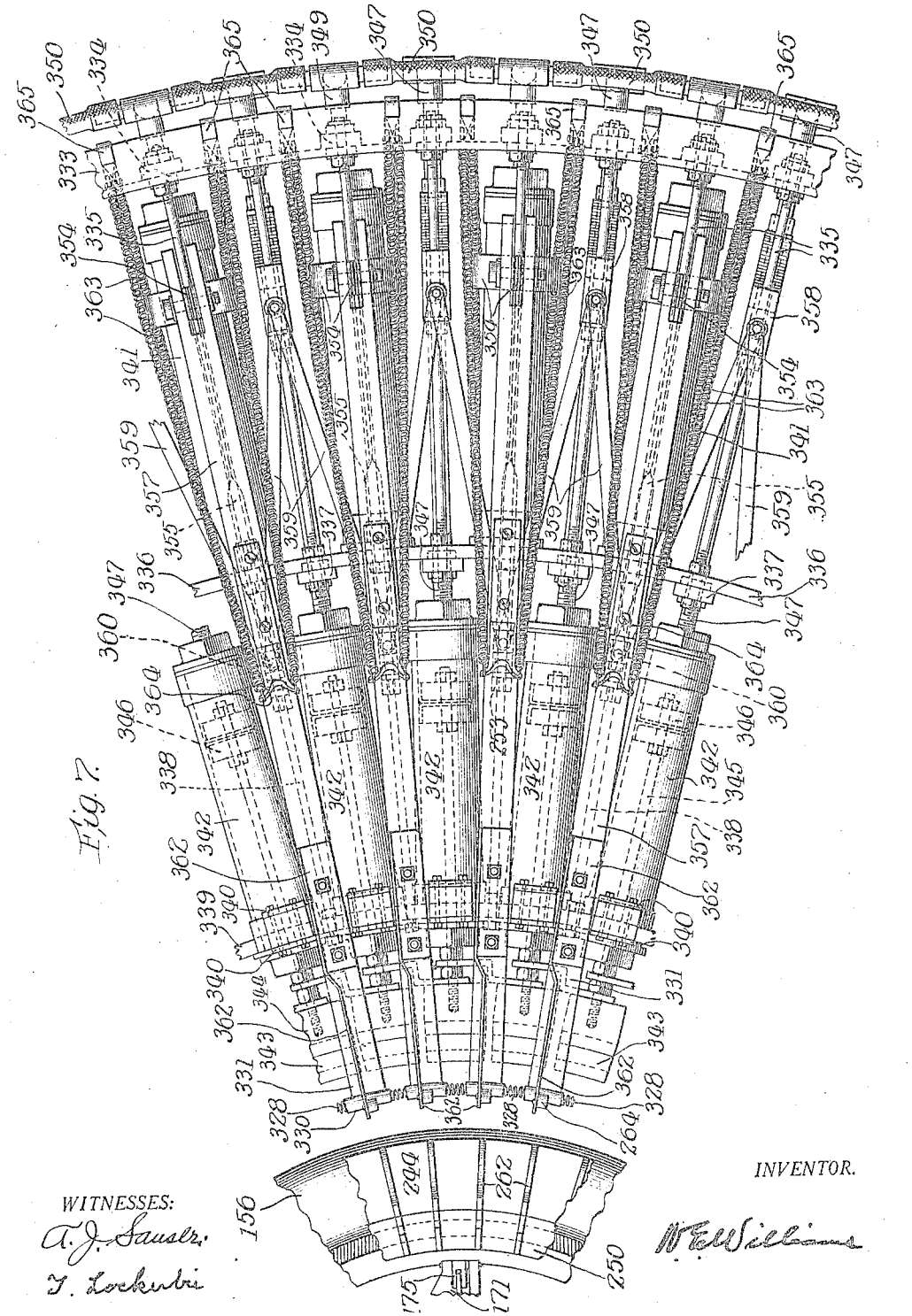

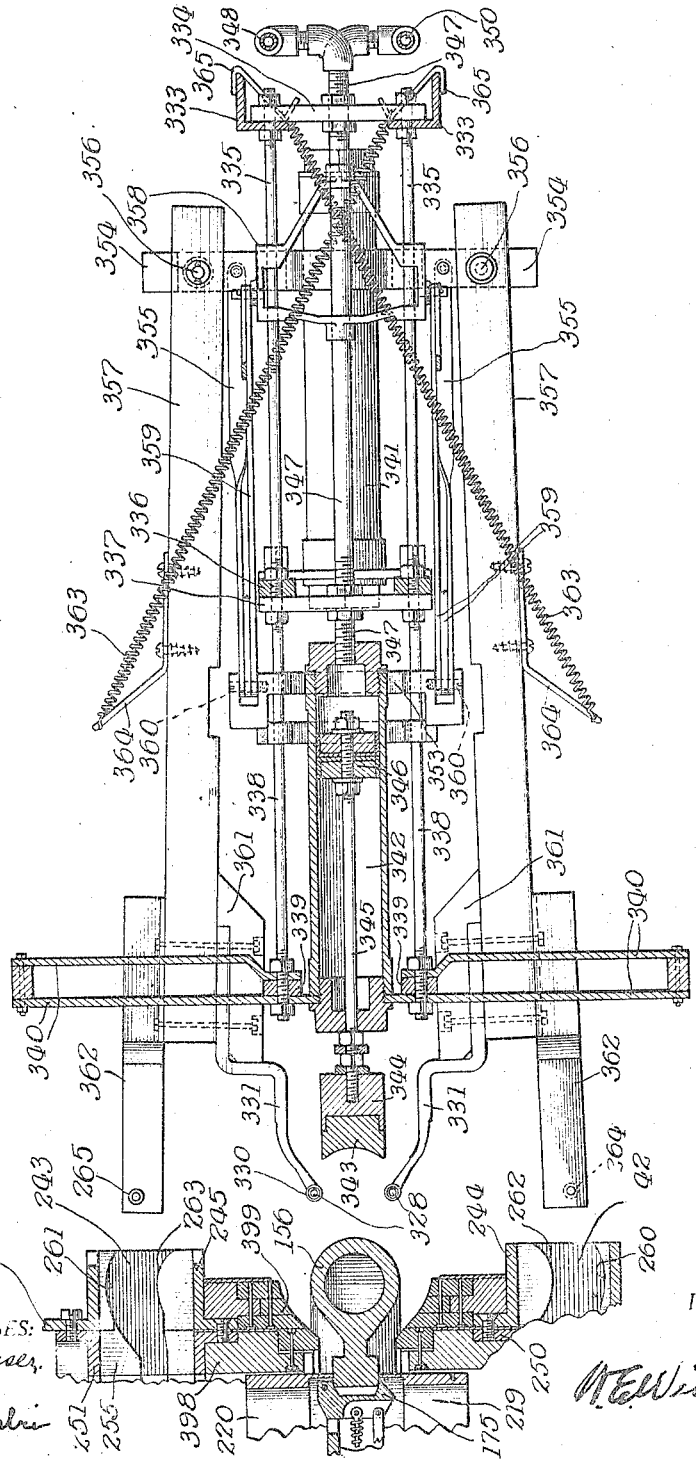

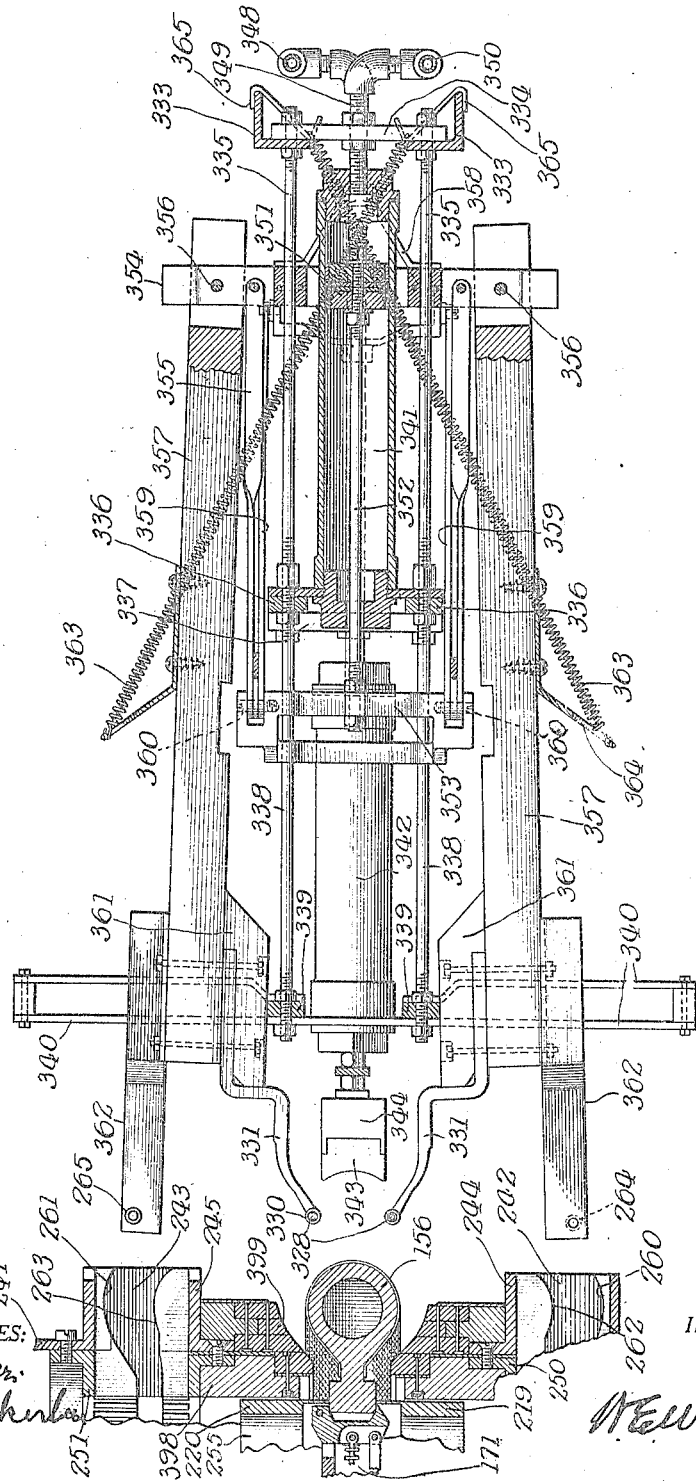

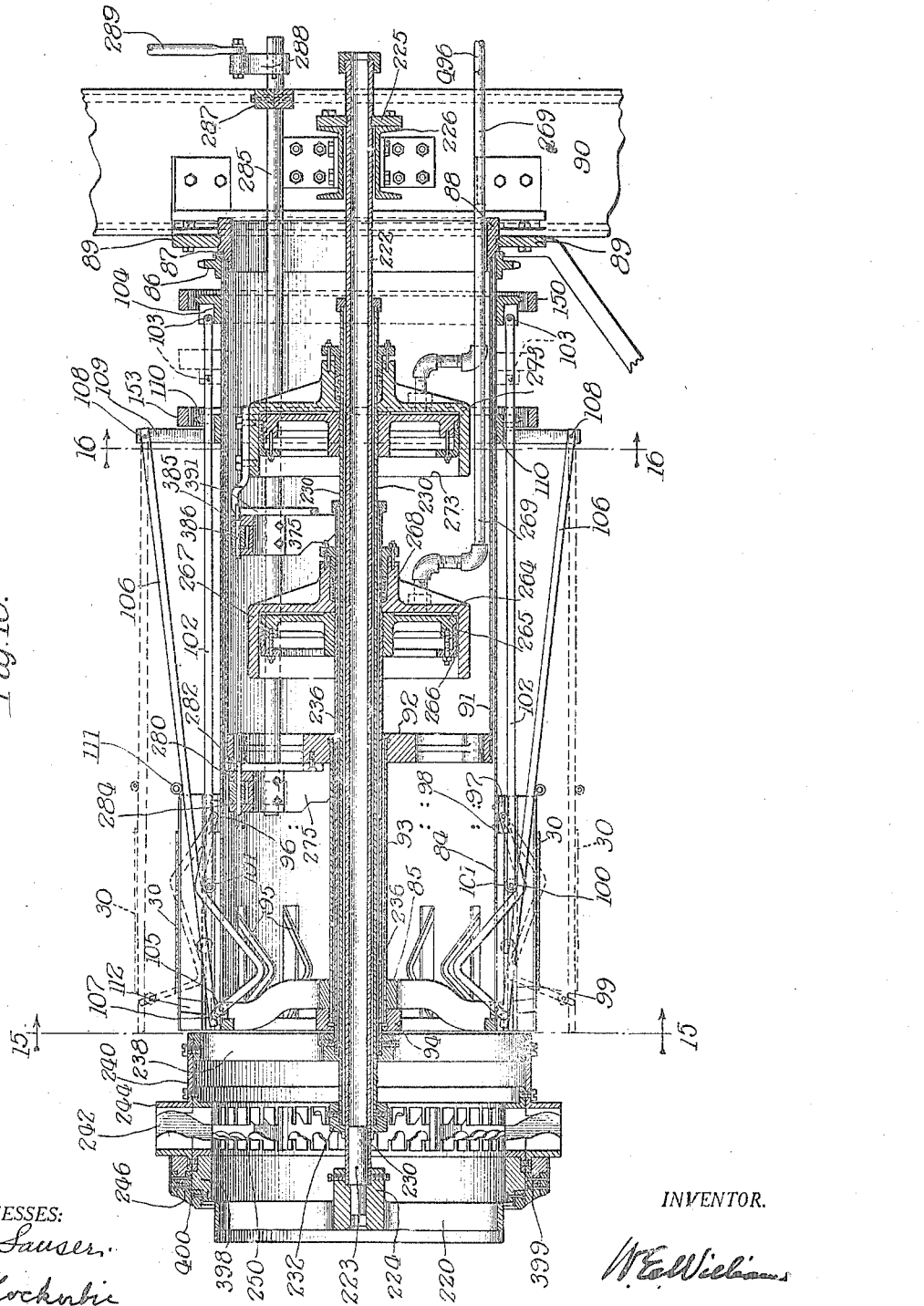

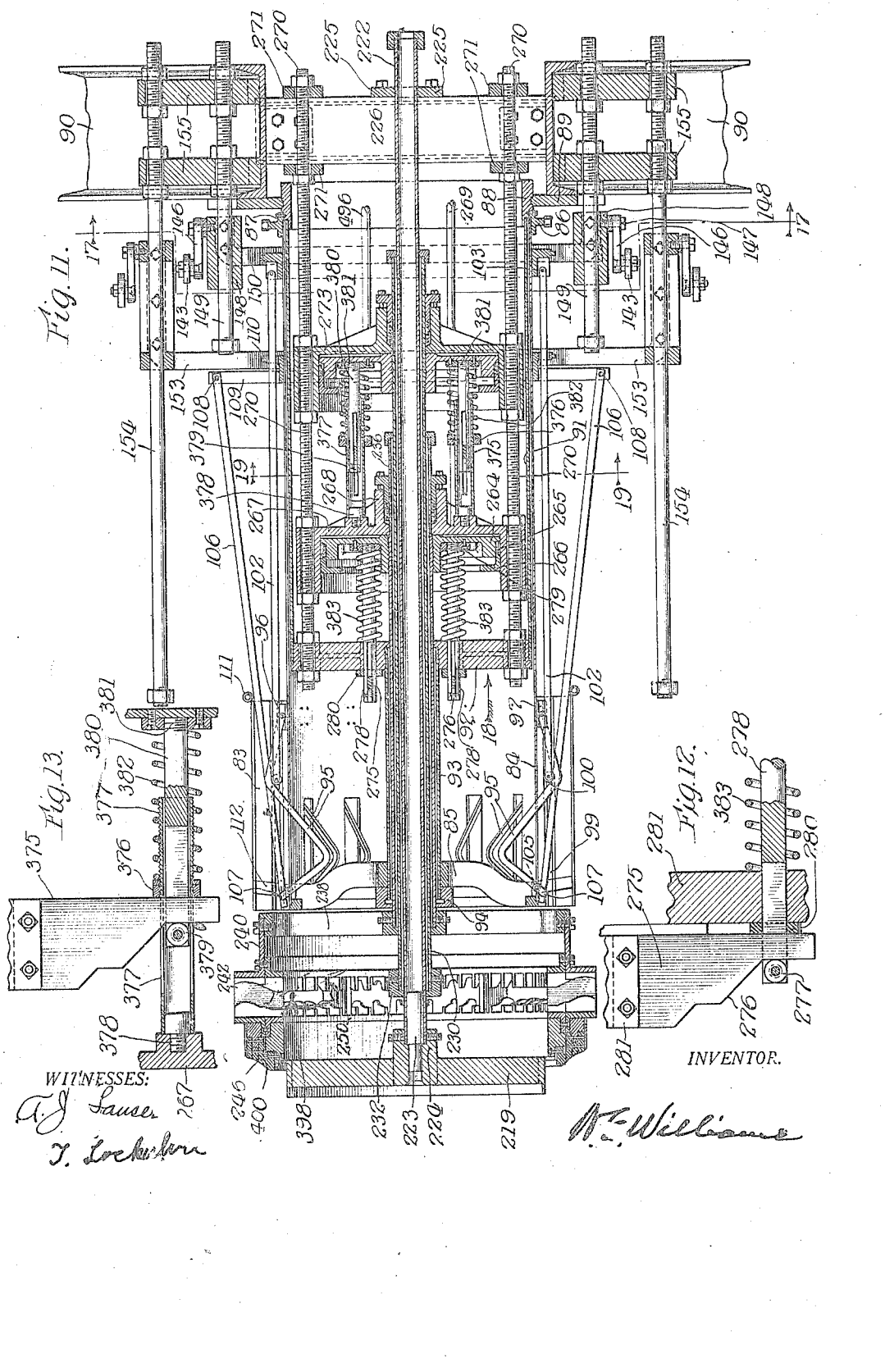

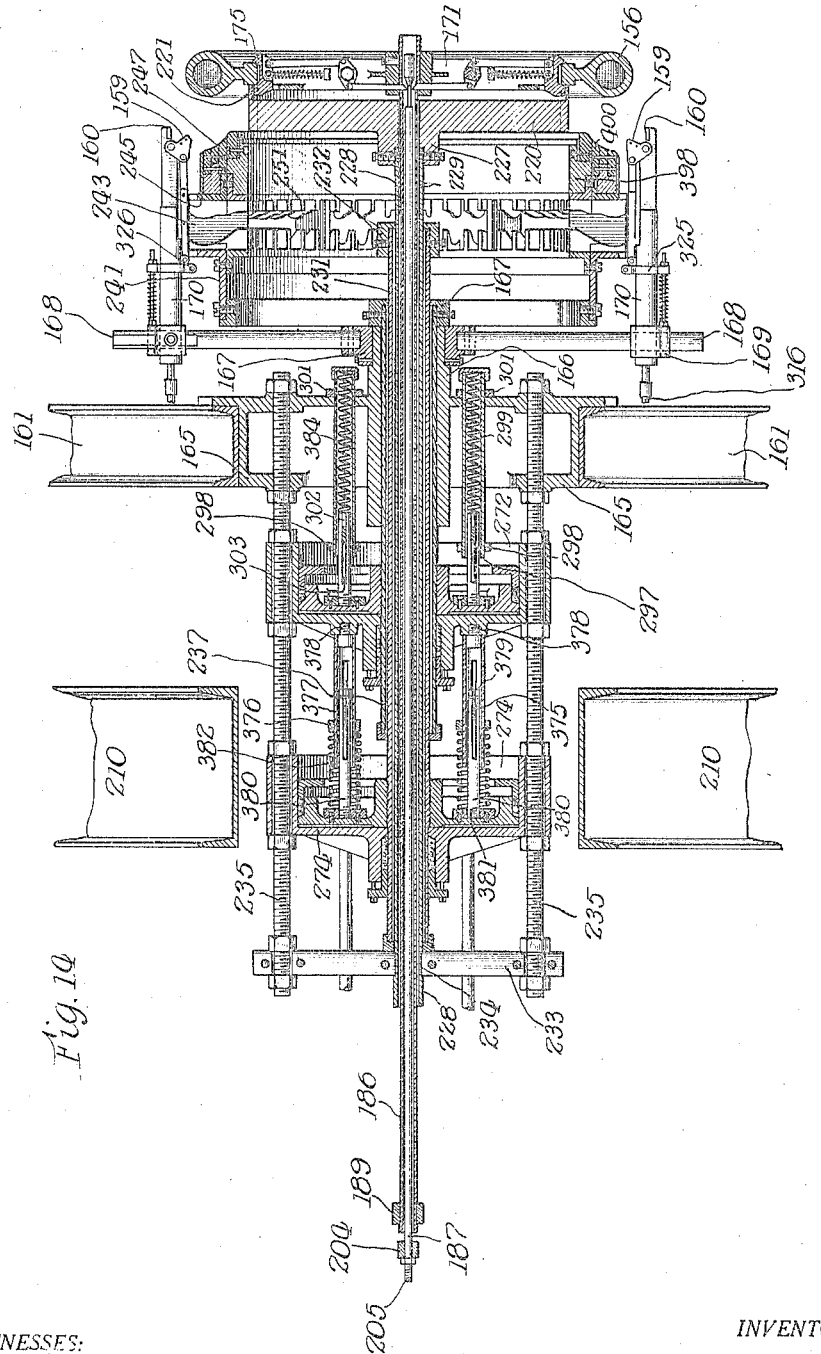

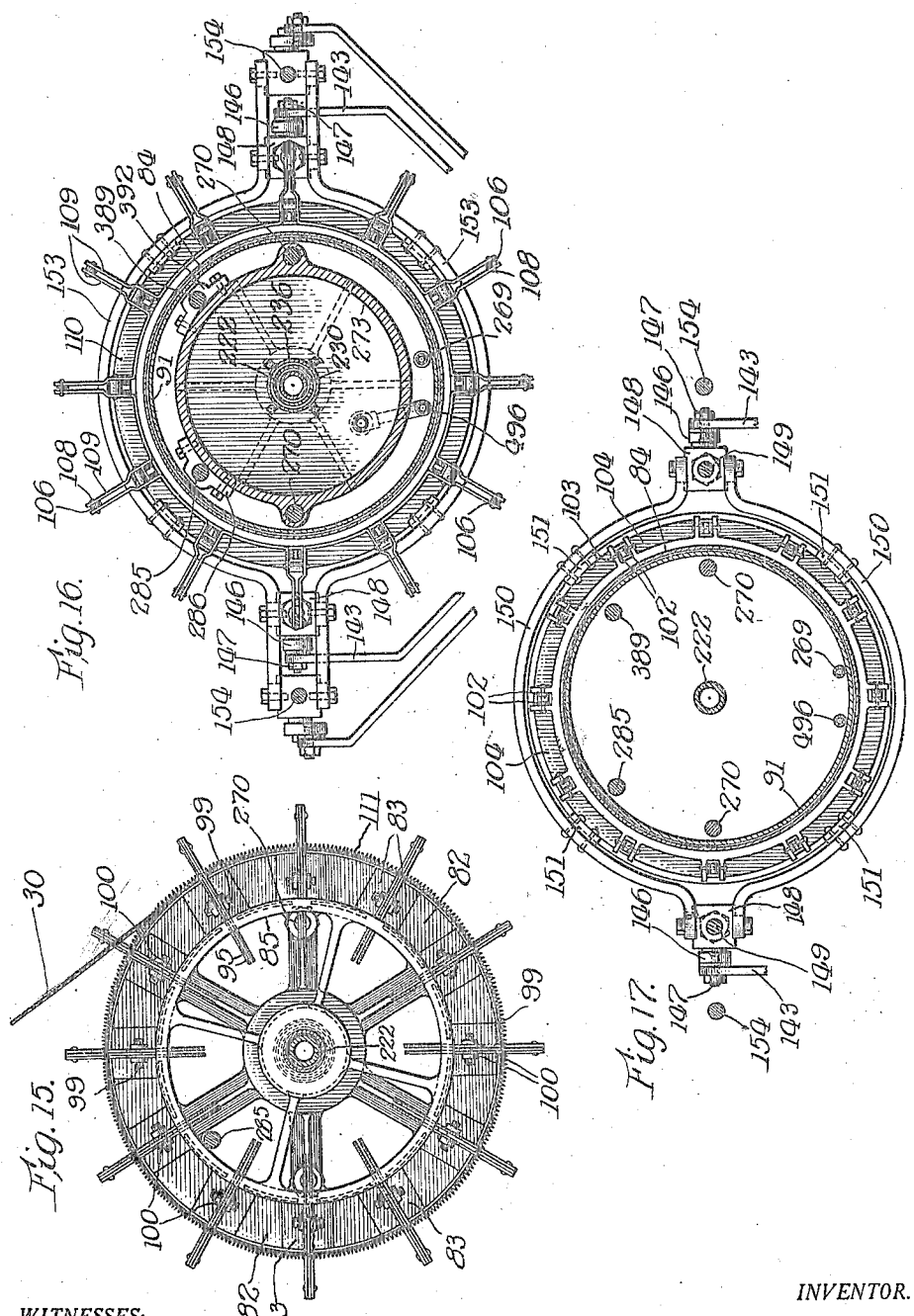

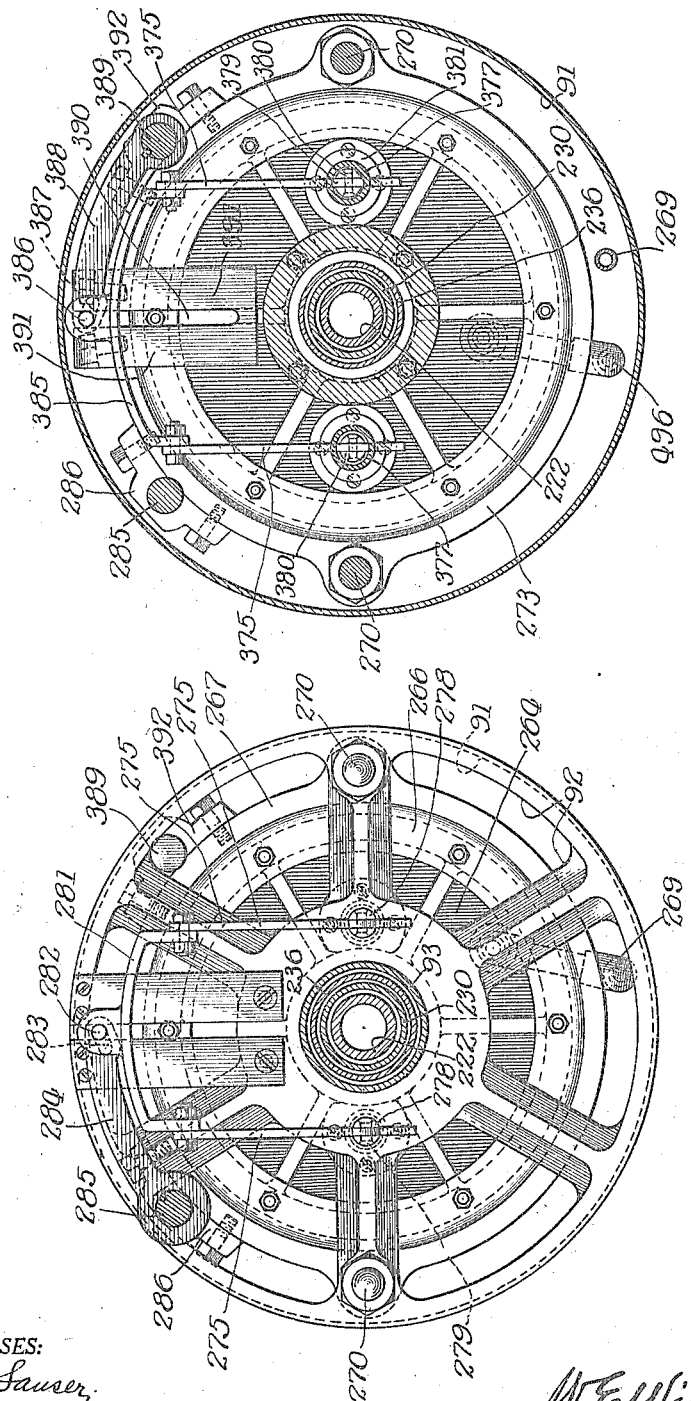

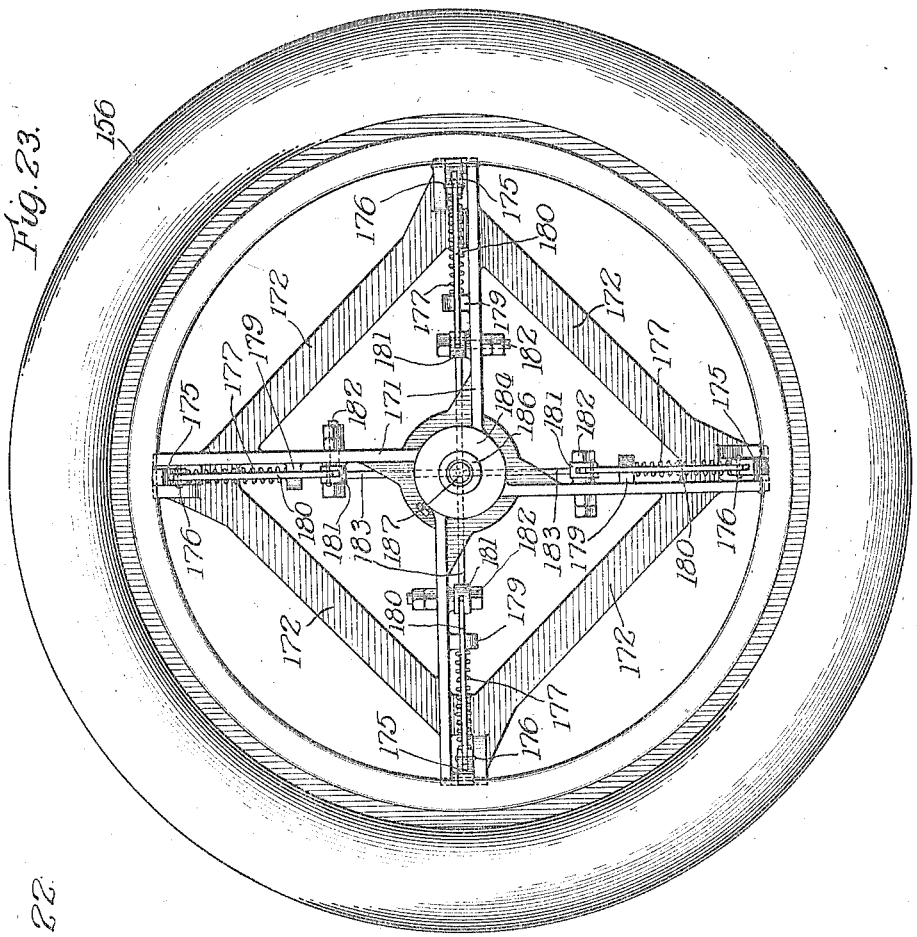
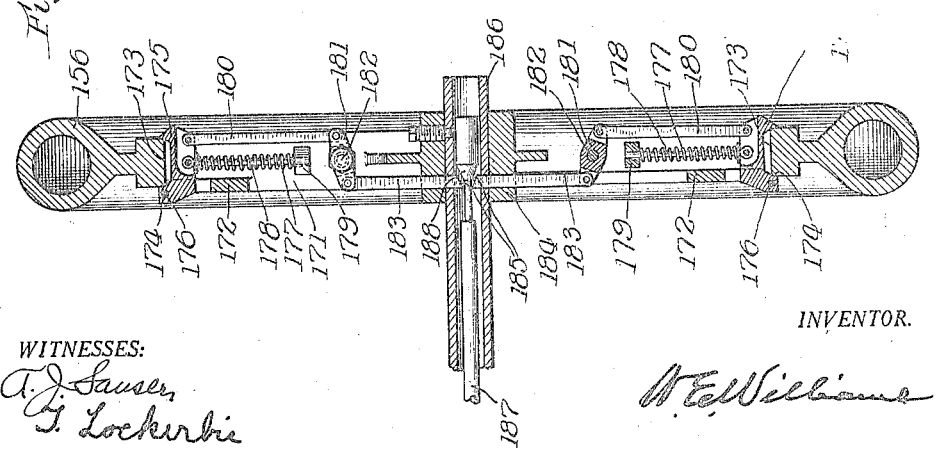

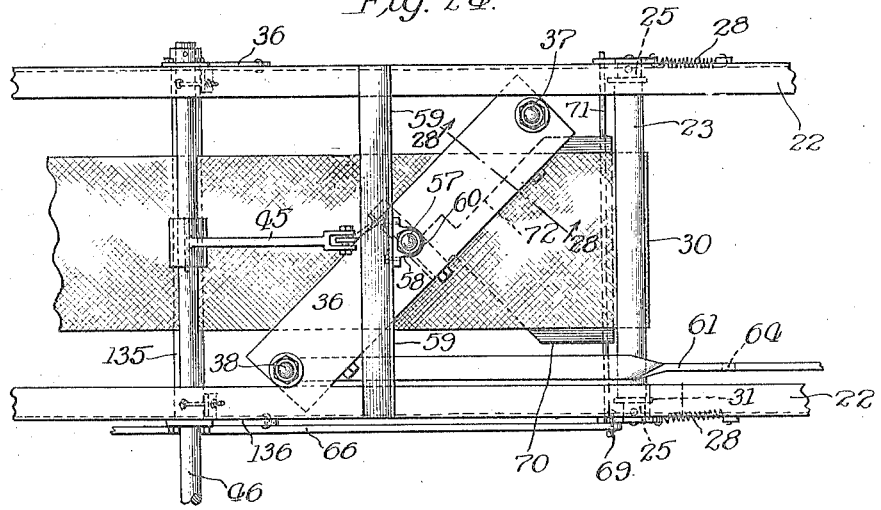
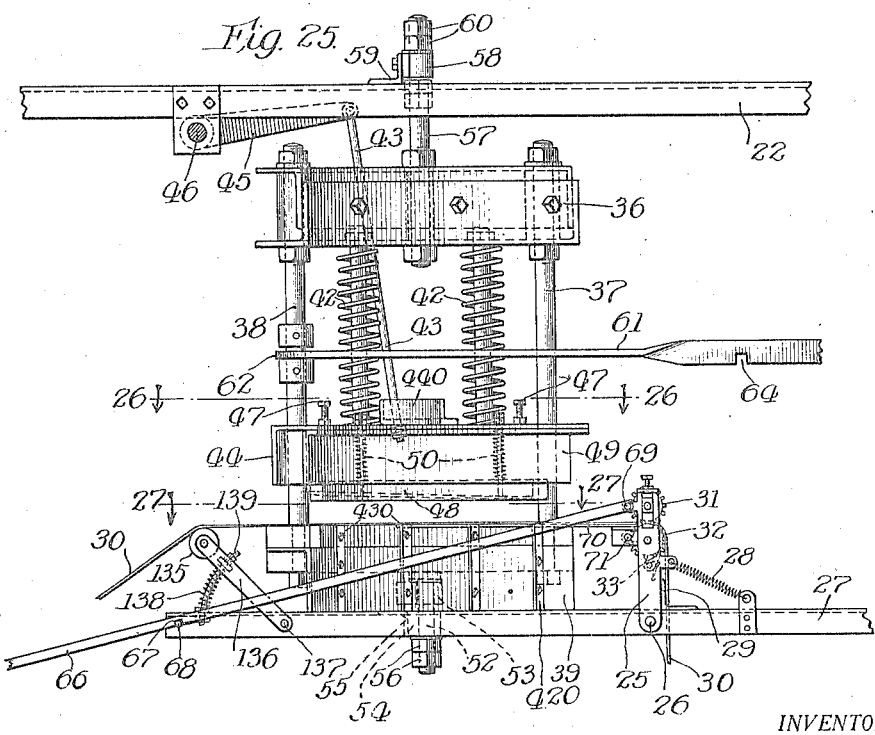

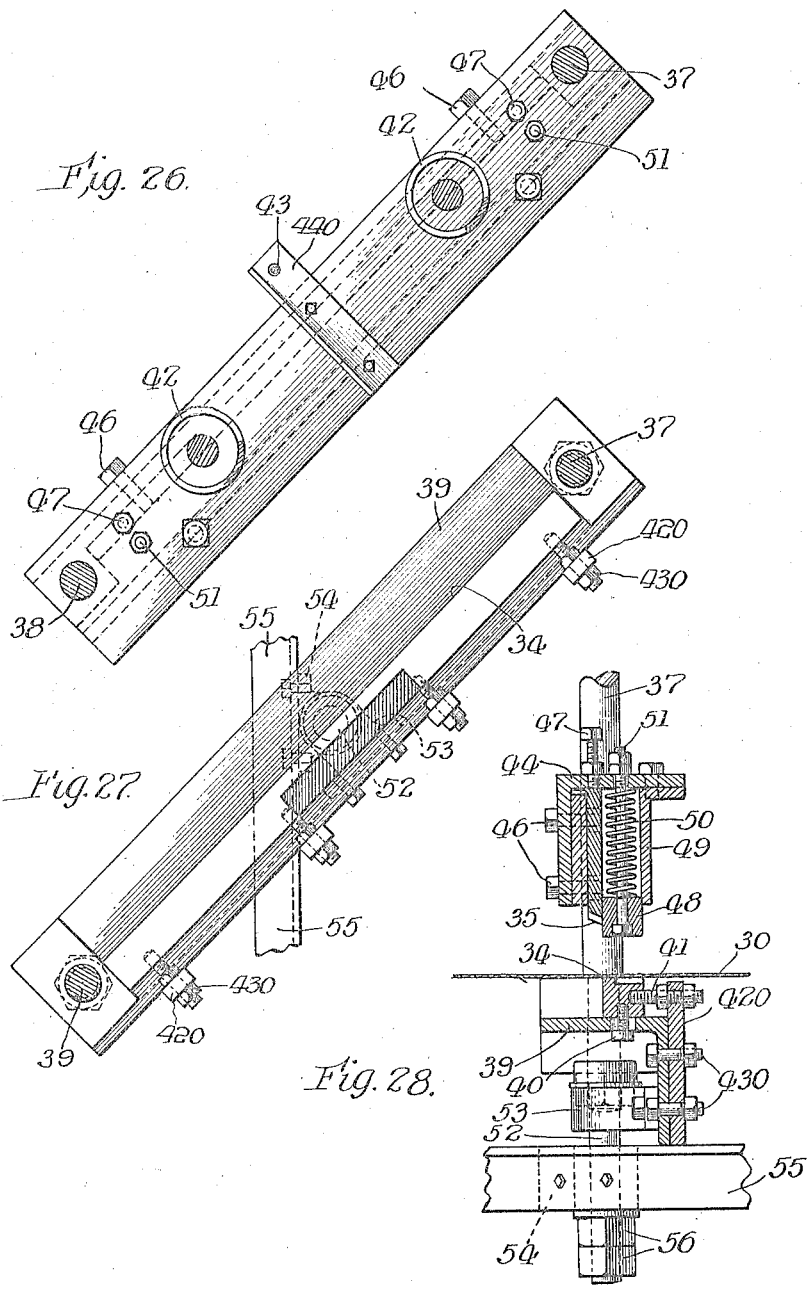

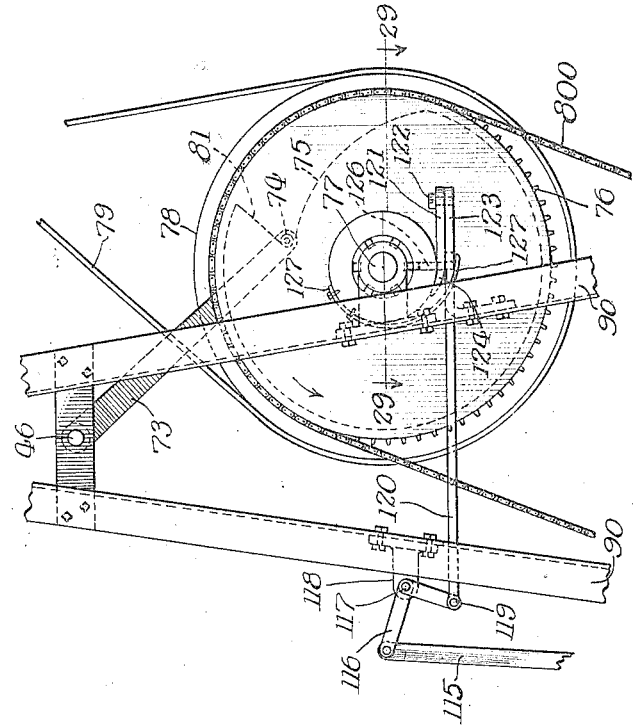

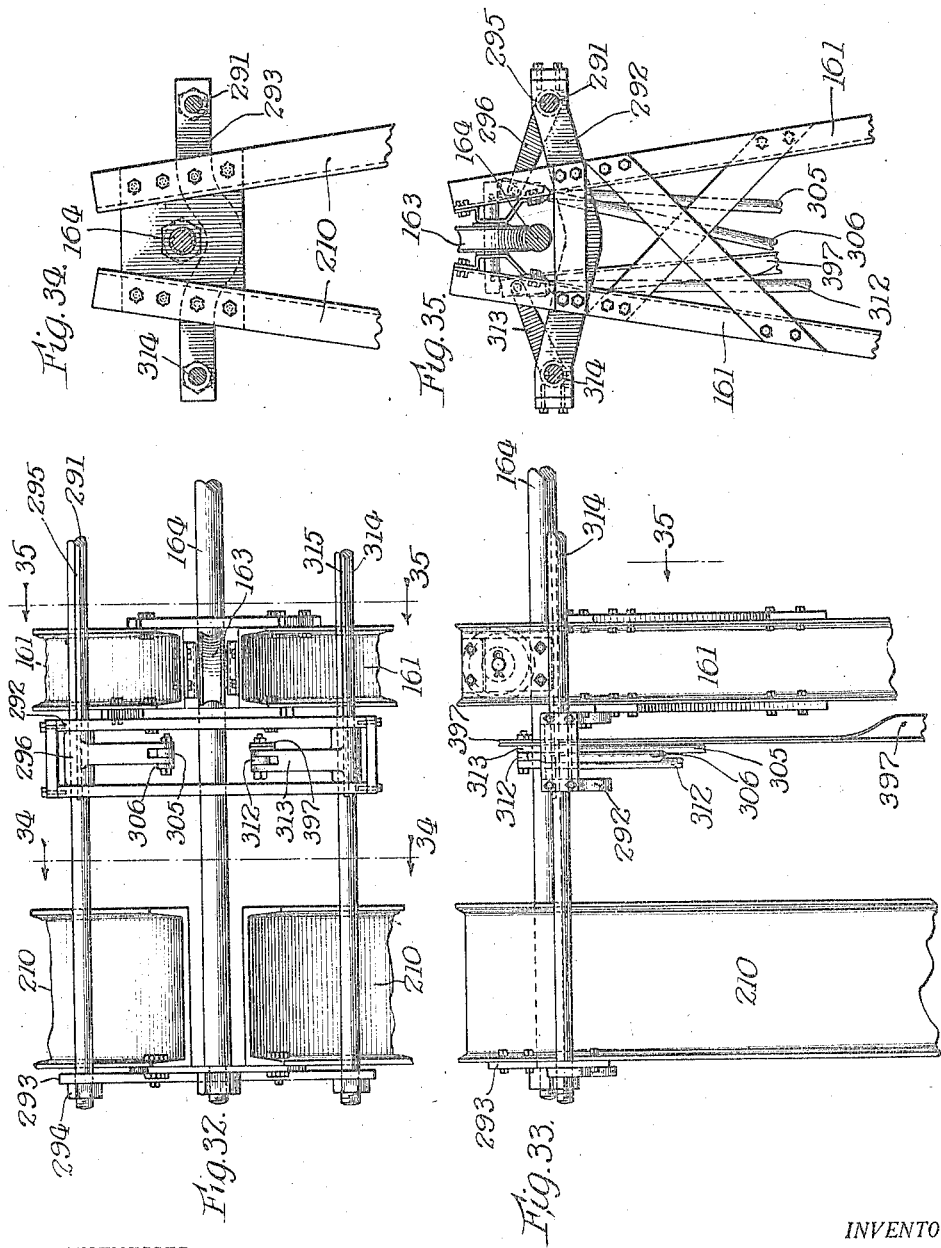

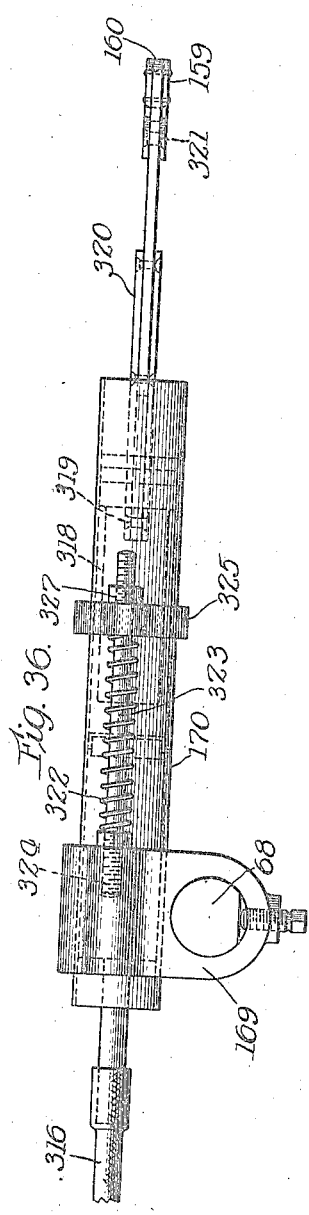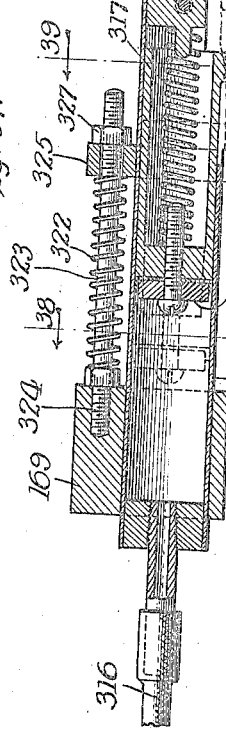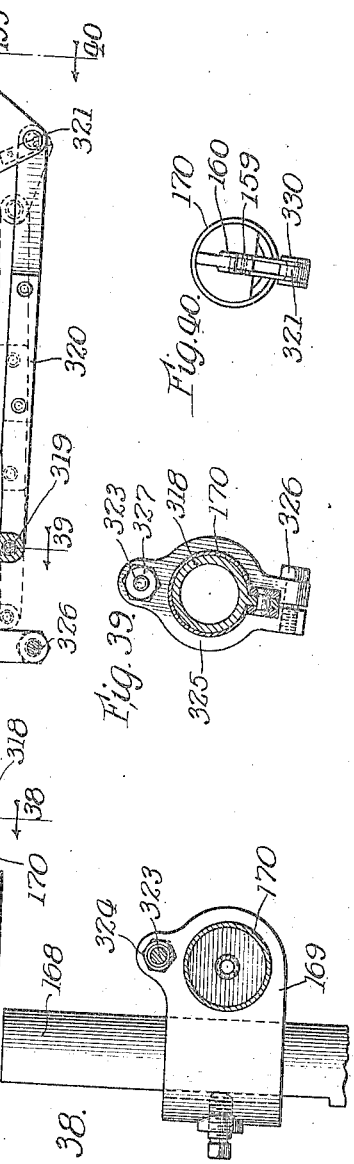

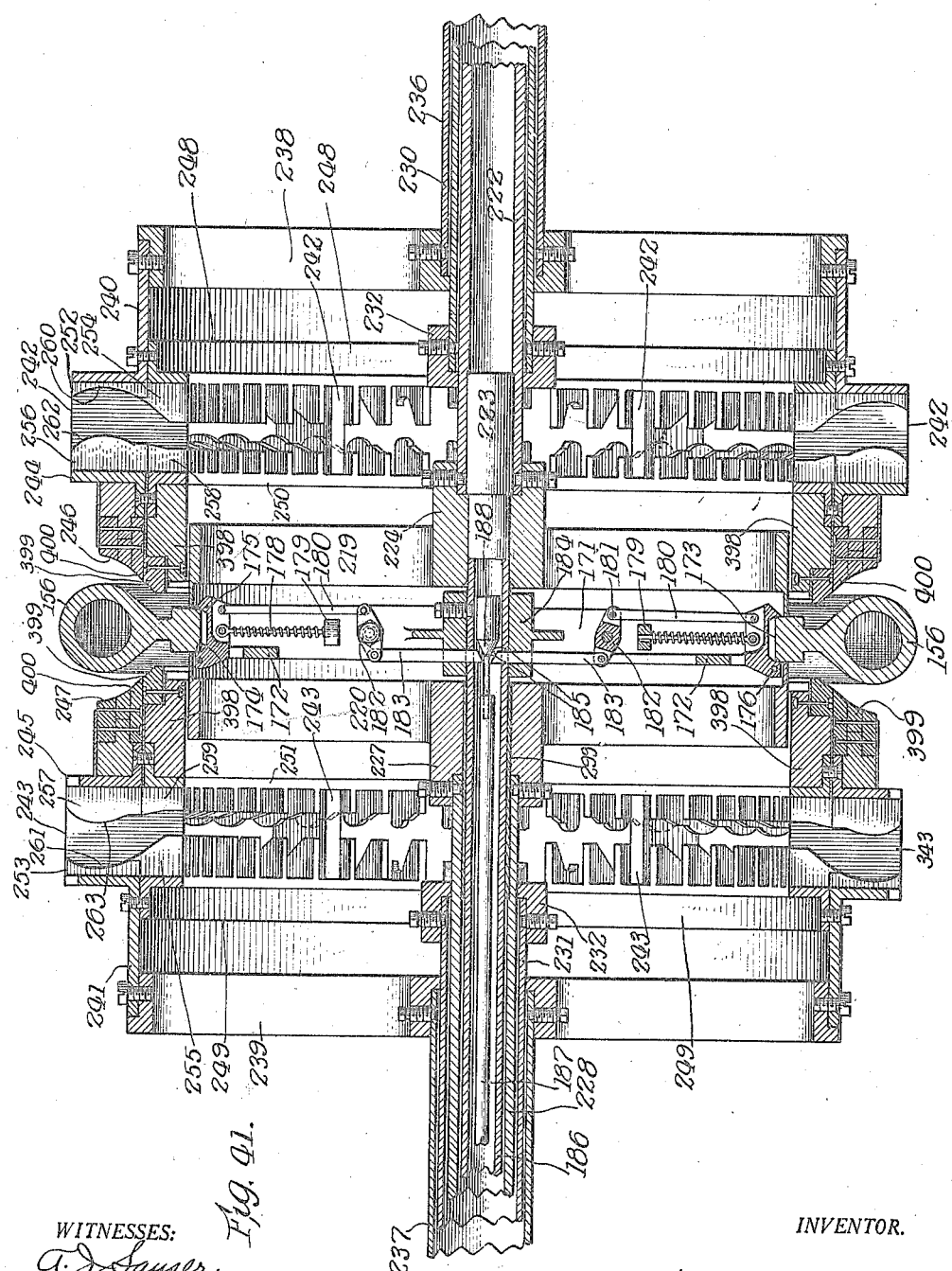

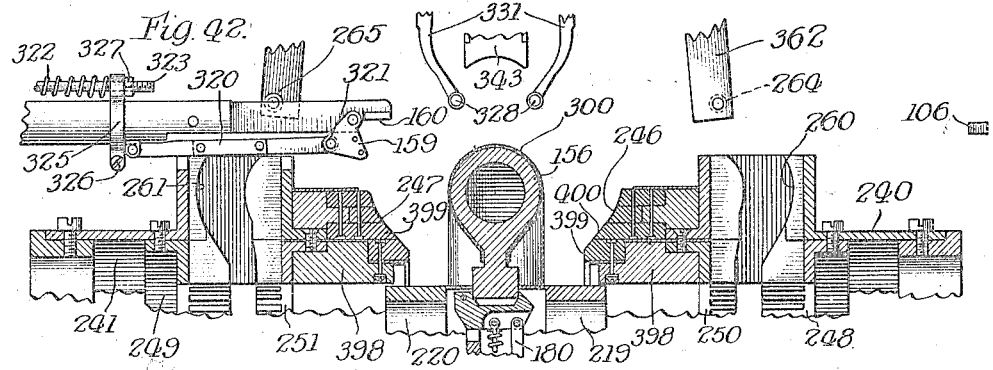
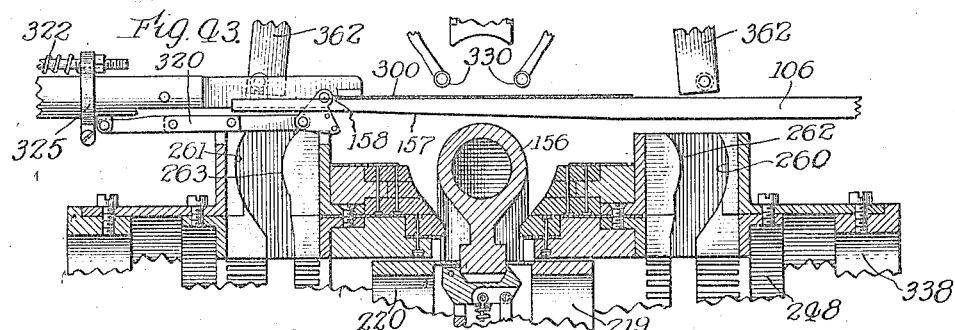
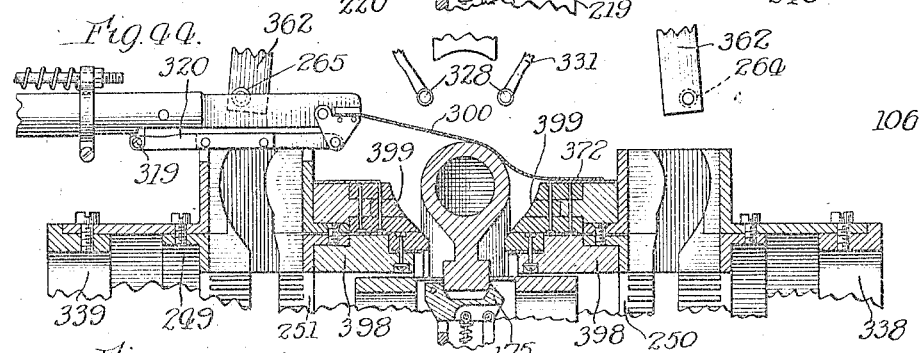
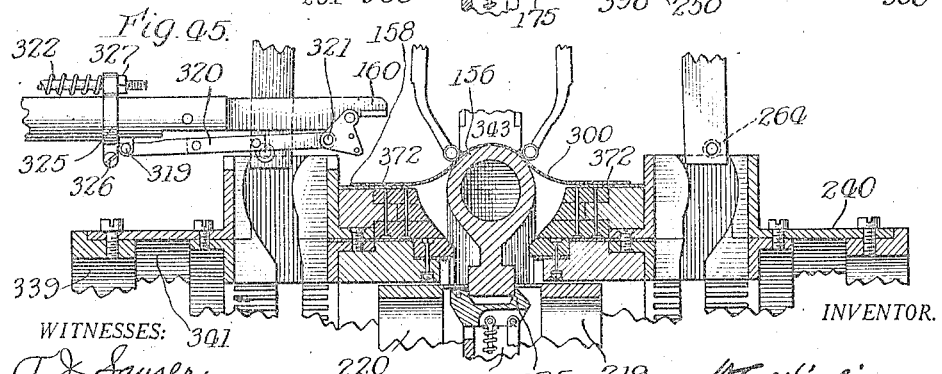

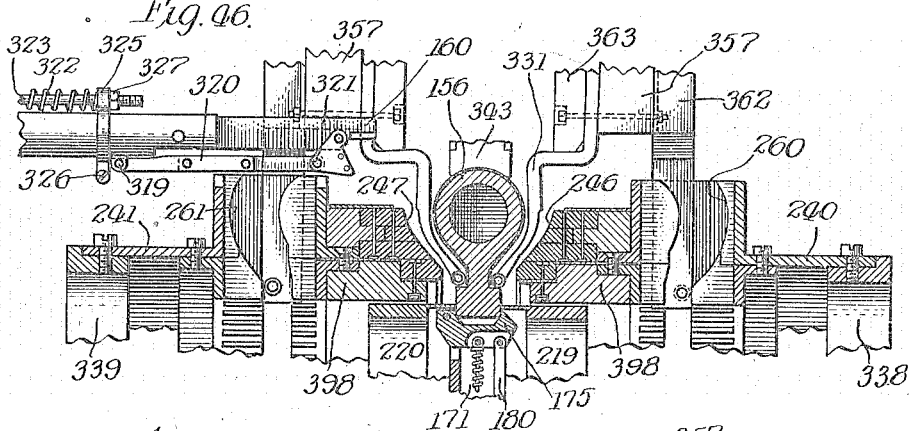
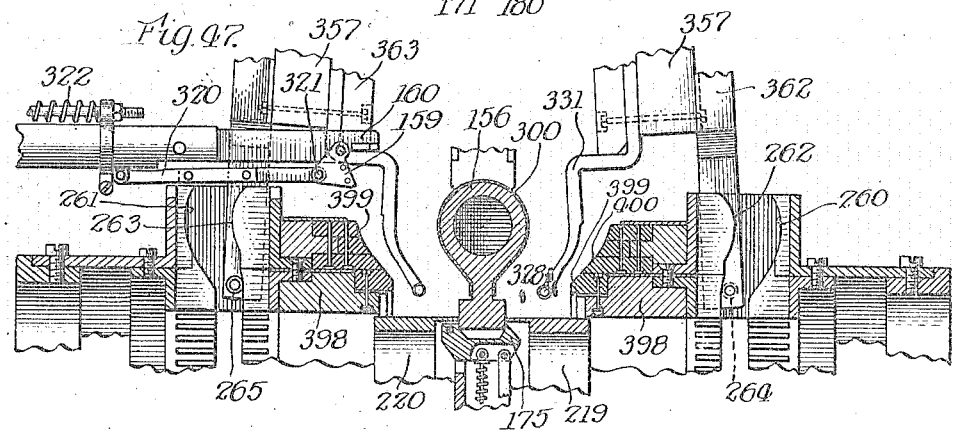
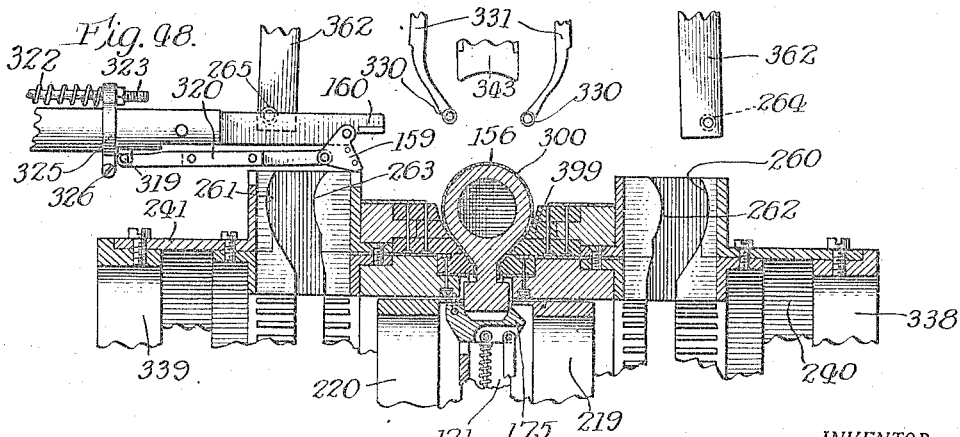

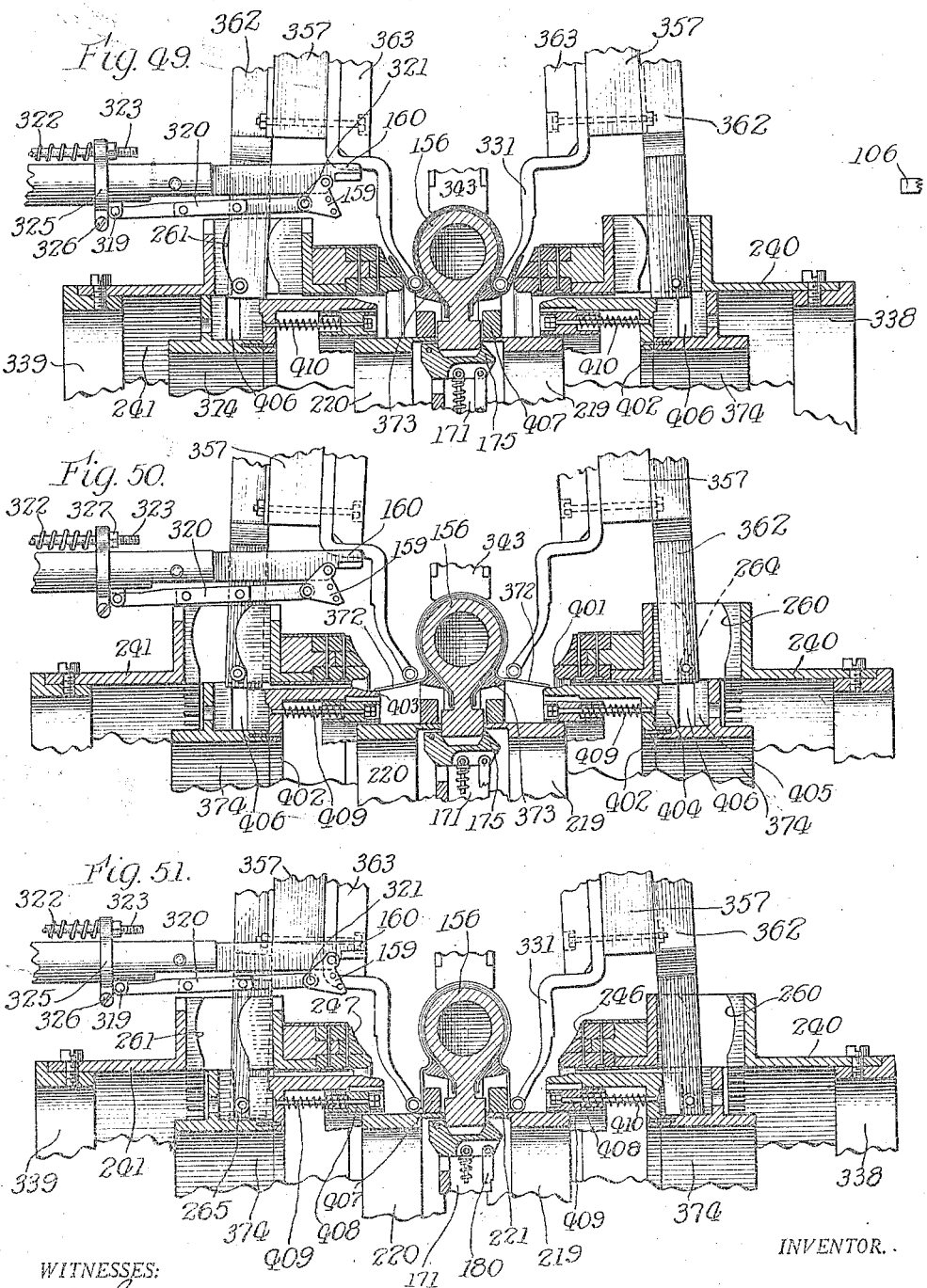

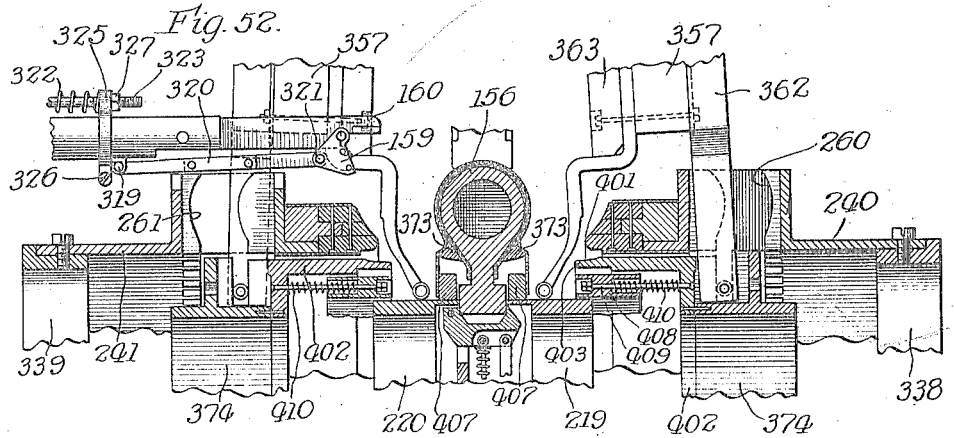
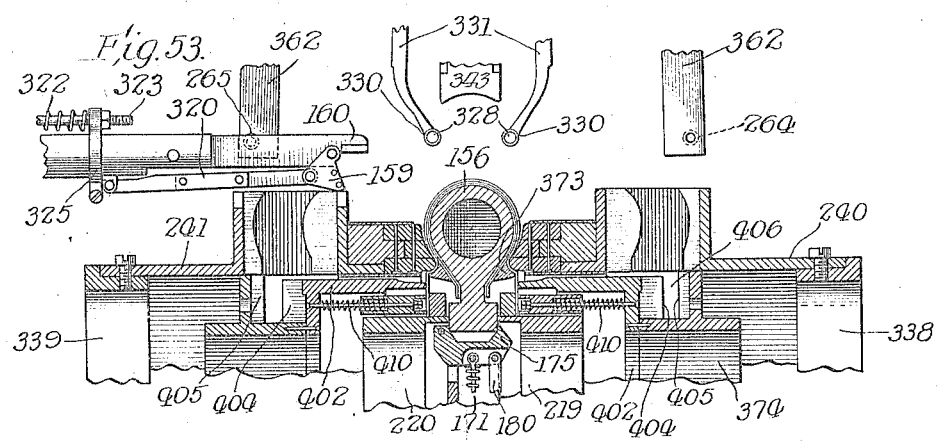
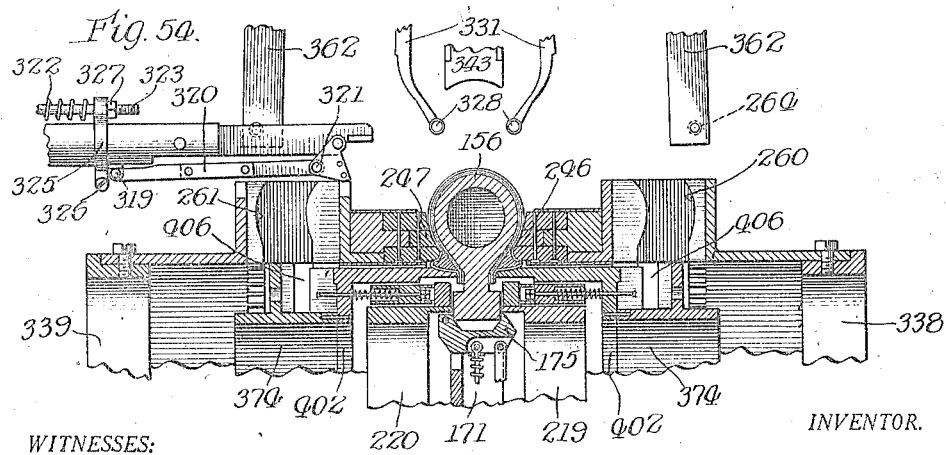

1,441,767

UNITED STATES PATENT OFFICE.

WILLIAM ERASTUS WILLIAMS, OF CHICAGO, ILLINOIS, ASSIGNOR TO THE FIRESTONE TIRE AND RUBBER COMPANY, OF AKRON, OHIO, A CORPORATION OF OHIO.

MACHINE FOR MAKING AUTOMOBILE TIRE-CASING CARCASSES.

Application filed May 25, 1918. Serial No. 236,614.

*To all whom it may concern:*

Be it known that I, WILLIAM ERASTUS WILLIAMS, a citizen of the United States, and a resident of Chicago, county of Cook, and State of Illinois, have invented a new and useful Improvement in Machines for Making Automobile Tire-Casing Carcasses, of which the following is a specification.

My invention relates to machines that apply successive layers of fabric to the iron cores used in the manufacture of tire casings and has for its object the production of a machine that will have large capacity in the work and make a superior product. The invention is set forth in the claims.

Heretofore machines of this class have wound the fabric from a roll of fabric on to the iron core under tension thereby stretching the fabric as it was successively applied to the core and when a full ring of fabric was applied the end of the cloth was cut and spliced by hand while the main body of fabric was on the core. In this way the two end portions of each layer were stretched less than the main body portions throughout the circumference of the core.

After each ring of fabric was applied as above indicated it was "stitched" or formed down to conform to the shape of the core and then other layers were applied.

Thus in the old machines there were two essentially distinct and separate sets of mechanism substantially independent of each other namely the fabric winding and stretching mechanism and the stitching or forming mechanism and one set was always idle while the other was at work and by reason of the fact that the fabric was stretched while being wound upon the core it necessarily was unevenly stretched as relates to the spliced end compared to the middle of the strip of fabric forming any single ring or layer of fabric.

In my machine I employ what may be termed three sets of mechanism instead of the two as above described, namely, a winding mechanism that takes the fabric from a roll and winds it into a ring and splices it without substantial stretching of the fabric. Then these rings are stretched or expanded uniformly throughout the periphery of the ring of fabric to a size slightly larger than the core and then the expanded ring of fabric is applied to the core bodily and allowed to contract over the core in a uniform way. Then the ring of fabric on the core is stitched or formed down all at once all around the core.

By this method of working the winding and stitching mechanisms can be working in unison and pause only when the fabric is being applied to the core and the cores are being exchanged for fresh ones.

Reference will be had to the accompanying drawings in which Figure 1 Sheet 1 is a side elevation of the entire machine, Figure 2 Sheet 2 is a side sectional elevation differing from Figure 1 only in being a section, Figure 3 Sheet 3 is a transverse sectional elevation showing the stitching wheel, Figure 4 Sheet 4 is an end elevation at the right end of the machine, Figure 5 Sheet 5 is an end cross sectional elevation at the left of the machine on line 5—5 of Figure 1. Figure 6 Sheet 6 is a side elevation showing stitching fingers on the left side of the machine looking from the center line of the plane of the core towards the left. The lower side of the view shows the fingers when down and the upper side is in section on the line of the cams that guide the fingers.

Figure 7 is an enlarged view of some of the stitching mechanism when it is out of action.

Figure 8 Sheet 8 is a transverse view of a section through one side of the stitching wheel.

Figure 9 Sheet 9 is a similar view of that of Figure 8 but at a section on an adjacent cylinder.

Figure 10 Sheet 10 is a vertical section through the right or winding side of the machine showing the winding and expanding drum and pressure cylinders on that side.

Figure 11 Sheet 11 is a plan section showing the same parts shown in Figure 10. Figures 12 and 13 Sheet 11, are details of die stops and will be explained later.

Figure 14 Sheet 12 is a plan section of the pressure cylinders at the left end of the machine.

Figure 15 is an end of the winding drum as indicated by line 15—15 of Figure 10 Sheet 10.

Figure 16 is a cross section on line 16—16 of Figure 10 Sheet 10.

Figure 17 is a cross section on line 17—17 of Figure 11 Sheet 11.

Figure 18 Sheet 14 is an end elevation of the supporting drum at the right of the machine in the direction of arrow 18 Figure 11.

Figure 19 Sheet 14 is a sectional elevation of the supporting drum on line 19—19 of Figure 11.

Figure 20:
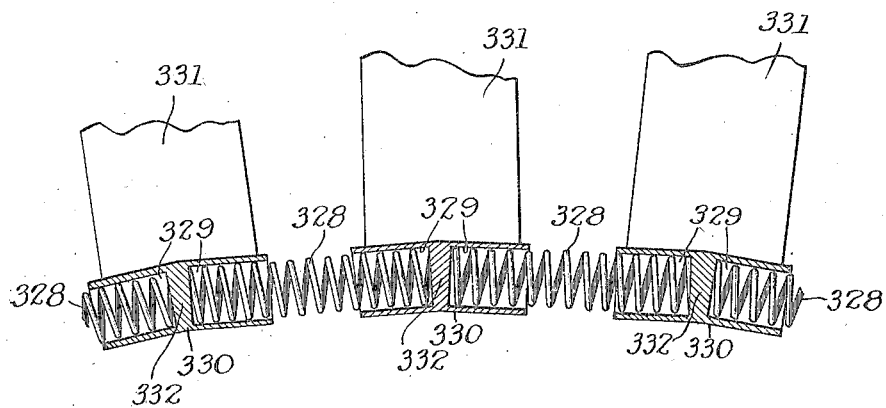
Figure 21:
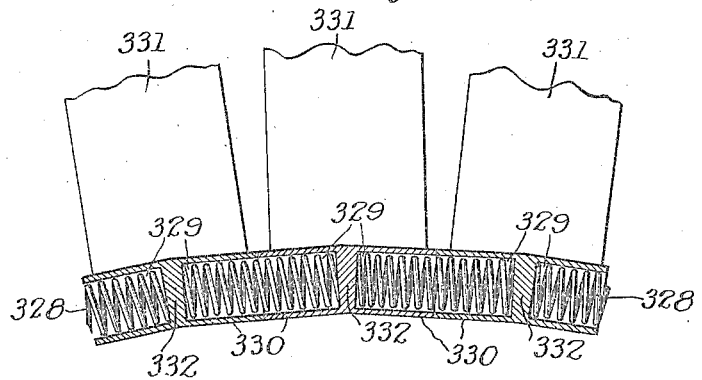

Figure 20 Sheet 15 shows the stitching fingers when up out of service and Figure 21, same sheet, shows them when moved into the innermost position.

Figure 22 Sheet 16 is a section of the core mounted on the core supporting spindle and Figure 23, same sheet, shows an elevation of the same parts.

Figure 24, Sheet 17, is a plan and Figure 25, same sheet, an elevation of the automatic shear that cuts off the fabric at the right length for each ring.

Figure 26, Sheet 18, is a plan on line 26—26 of Figure 25.

Figure 27 is a plan on line 27—27 of Figure 25.

Figure 28 is a cross-sectional elevation of the shear parts on line 28—28 of Figure 24.

Figures 29, 30 and 31, Sheet 19, show details of the power driving means for the winding drum in which Figure 29 is a plan section on line 29—29 of Figure 31 and Figure 30 an elevation from the left side of Figure 31 and Figure 31 an end elevation from the right side of the machine.

Figures 32, 33, 34 and 35 Sheet 20 are details of the frame parts at the left of the machine, in which Figure 32 is a top plan, Figure 33 a side elevation, Figure 34 a sectional elevation on line 34—34 of Figure 32 and 35 a sectional elevation on line 35—35 of Figure 32.

Figures 36, 37, 38, 39 and 40 Sheet 21 relate to the gripping fingers that seize the cloth and register it over the core when the cloth rings are applied to the core, in which Fig. 36 is a plan, Figure 37 a side elevation partly in section of a single finger, Figure 38 a section on line 38—38 of Figure 37, Figure 39 a section on line 39—39 of Figure 37 and Figure 40 an end looking from line 40—40 of Figure 37.

Figure 41, Sheet 22, is a section through the core fabric pressing dies and guide cams for the stitching fingers in assembled position ready for the application of a ring of cloth to the core.

Figures 42, 43, 44 and 45 Sheet 23 are sectional detail views showing several steps in applying a layer of fabric to the core.

Figures 46, 47 and 48, Sheet 24, are similar views to the Figures 42 and 45 and show the further steps in applying the fabric.

Figures 49, 50 and 51 of Sheet 25 and Figures 52, 53 and 54 of Sheet 26 are sectional views showing the stages of applying the outer layers of fabric which cover over the outside of the beads.

The machine is composed of several sets of mechanisms as follows:

The fabric to be applied to the cores is supplied in rolls wound inside of protecting rolls of muslin as is the custom in handling material of this class.

As the machine consumes material very rapidly and forms it into rings intermittently, I provide mechanism that unwinds the roll of supply fabric in a steady uniform rate thus providing an unwound loose loop of stock sufficient for a single ring always ready for the quickly acting winding drum.

The stock of fabric supplied by the loose loop is drawn through a shear mechanism by hand and by the action of the winding drum and at a determined point in its course it is sheared off automatically by a shear acting under the influence of a cam in unison with the movement of the winding drum. The ends are spliced into a ring on the drum and then the ring of fabric is expanded in diameter and projected over the core being held in place while the expanding mechanism is withdrawn. The fabric contracts to the core and is simultaneously stitched down on all sides at once. Then elastic faced dies that fit the sides of the core are forced against the sides of the core and complete the stitching. The core is carried by a spindle on a movable carriage that moves into and out of the embrace of the stitching mechanism to facilitate the entrance and removal of the cores.

The stitching mechanism is a large ring containing cylinders actuated by compressed air and mounted to reciprocate radially arranged pistons that move the radially arranged stitching fingers.

The elastic faced dies are also operated by compressed air cylinders.

The unwinding of the fabric from the supply roll, the operation of the shear and the winding drum are under the influence of an electric motor.

The expanding and projecting mechanisms are actuated by compressed air.

Figure 4:
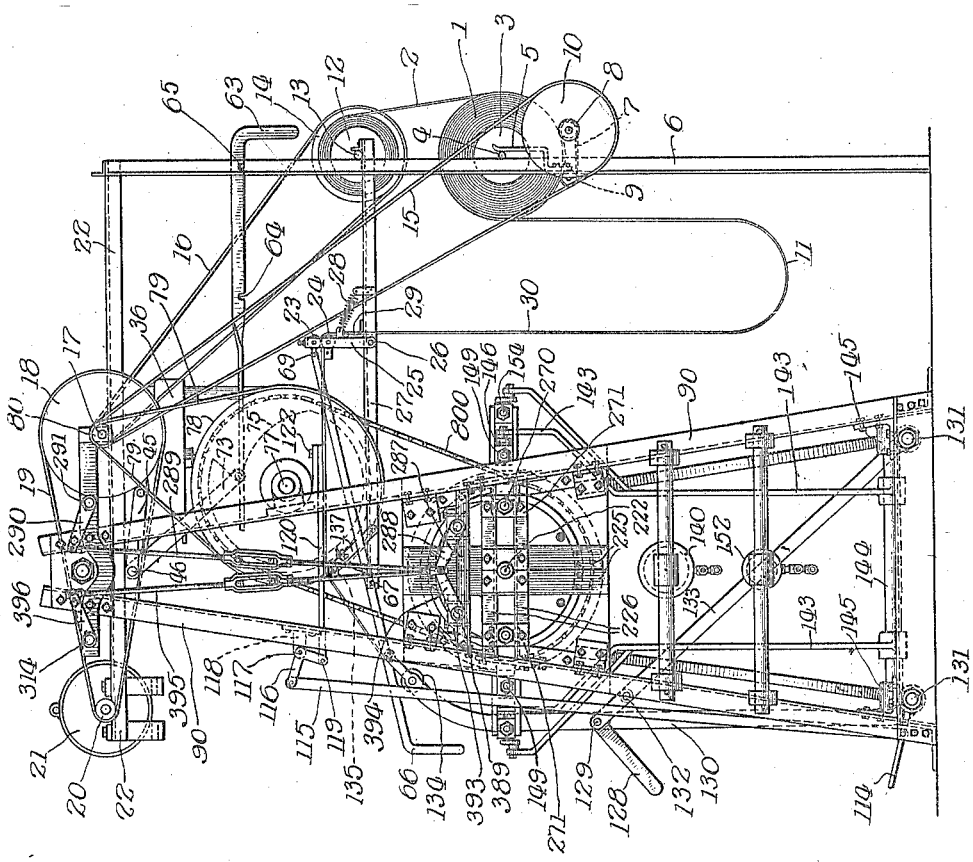

In the drawing see Figure 4, Sheet 4, 1 indicates the roll of supply fabric interwound with a roll of protecting muslin strip 2. This roll is mounted on a small drum 3, on a spindle 4, which floats up and down within the embrace of brackets 5, fixed to the auxiliary frame posts 6 of the machine. The composite fabric roll 1, rides on the short belt 7 which is carried over two small rollers 8 and 9. Upon the axis of the roller 8 there is a belt wheel 10 which drives the roller 8 and belt 7 and thus slowly unwinds the composite fabric roll at a determined rate of speed causing the unwound strip of fabric to form into a loop 11. The protecting muslin strip 2 as it comes from the composite roll 1 is rewound upon a drum 12 the axis 13 of which is mounted in brackets on the auxiliary frame 6 and the travel of the drum 12 is controlled by a belt wheel 14 on the shaft 13 of the drum 12.

The belt wheels 10 and 14 are driven by belts 15 and 16 from small pulleys on a shaft 17 to which is secured a belt wheel 18 driven by a belt 19 running over a pulley 20 of the motor 21 mounted on the frame pieces 22 of the machine. The rate of speed at which the fabric is delivered into the loop 11 is timed sufficiently to meet the supply of fabric required for the intermittently acting winding drum which forms the fabric strip into rings as desired.

From the loop 11 the fabric strip 30 is drawn through some friction rollers 23 and 24 mounted in a rocker frame 25 on an axis 26 on the frame pieces 27. A spring 28 holds the frame 25 normally against a stop bracket 29. The rollers 23 and 24 are geared together by small gears 31 and 32 and are under the control of a spring actuated pawl 33, see Figure 25 Sheet 17.

The pawl 33 permits the fabric strip 30 to be drawn forward through the rollers 23 and 24 but holds it from withdrawal backward into the loop 11. From the rollers 23 and 24 the fabric strip is drawn forward between the blades or cutting edges 34 and 35 of the shear indicated in Figures 24 to 28 on Sheets 17 and 18.

This shear is composed of the cross head, 36 here shown as composed of two angle bar sections, secured together by bolts, and into this cross head there are fixed, vertical guide posts, 37 and 38, at the bottom of which there is fixed the lower cross head block, 39, which is here shown as made of an angle bar. On this block 39 there is clamped the shear block 34, by the screws 40. The block is adjusted for wear takeup by the studs 41, secured in the blocks 420 which are fastened to the cross head block 39, by the bolts 430.

The movable shear-blade 35 is fixed to a reciprocating cross head 44, composed of an angle section and mounted to slide on the posts, 37 and 38, under the influence of the compression springs 42 which force the cross head downward when movement is permitted by the rod 43. This rod is connected to the cross head by the bracket 440, Figure 26, and at the other end, the rod 43 is connected to lever 45 on rocker shaft 46 mounted in boxes fixed to frame pieces 22.

The shear blade 35 is fixed to block 44 by screws 46 and is adjusted downward by screws 47.

A pressure pad block 48, Figure 28, is held in place by brackets 49 and pressed downward by springs 50 threaded over bolts 51 so that as the shear descends the pressure pad 48 holds the fabric strip 30 firmly in place on shear block 34 and prevents the fabric being drawn forward during the shearing operation.

The shear is preferably arranged to cut the fabric at an angle of 45 degrees across the strip and the direction of this angle must conform to the splices that are already in the continuous strip of fabric although the invention is not limited to this angle of cut, but the cut may be varied if desired. Sometimes this angle is in one direction and sometimes another and to accommodate the changes in the direction of the cutting angles I mount the shear on a vertical axis as indicated by the pivot stud 52 secured in block 53 secured to bar 39. The stud 52 is journaled in block 54 secured to a cross bar 55 of the frame pieces 27 and some nuts 56 on stud 52 sustain this end of the frame pieces 27 by carrying the weight up to the frame members 22 through the shear members.

In line with stud 52 there is a stud 57 in the cross head 36 and this stud is journaled in block 58 fixed to cross bar 59 of frame members 22. Nuts 60 sustain the stud 57.

The shear, mounted to turn on the studs as an axis as above described, is held in position and adjusted as desired by the bar 61 hinged at 62 to the post 38 of the shear and held in position on the post by set collars. The bar 61 passes backward from the shear and terminates in a handle 63, see Figure 4 Sheet 4, with which the operator adjusts the position of the shear and locks it in position by means of the notches 64 engaging a bolt 65 in the frame pieces 6.

After a section of cloth has been sheared and a new section is to be moved forward over the shear, the operator at the front of the machine, by means of a hand lever 66, which is connected at 69 to frame 25 of rollers 23 and 24, pulls forward the rolls overcoming the spring 28 in so doing and moves forward the end of the fabric strip 30 beyond the shear block 34 until the cloth extends out far enough for him to grasp the end and pull the cloth by hand through the rolls 23 and 24 out of loop 11 and stick the end of the cloth fabric to the splicing spot on the winding drum.

A notch 67 in bar 66 permits it to be engaged to a stud 68. To insure the movement of the end of the cloth over the edge of shear block 34 when rolls 23 and 24 are pulled forward as described, I provide the wedge pointed blade 70 hinged at 71 to the frame 25. This blade moves forward with the rolls 23 and 24 and strips the fabric loose from the shear block.

The wedge nose 72 of the blade 70 is made necessary to meet the adjustment of the angle of the shear.

Figure 1:
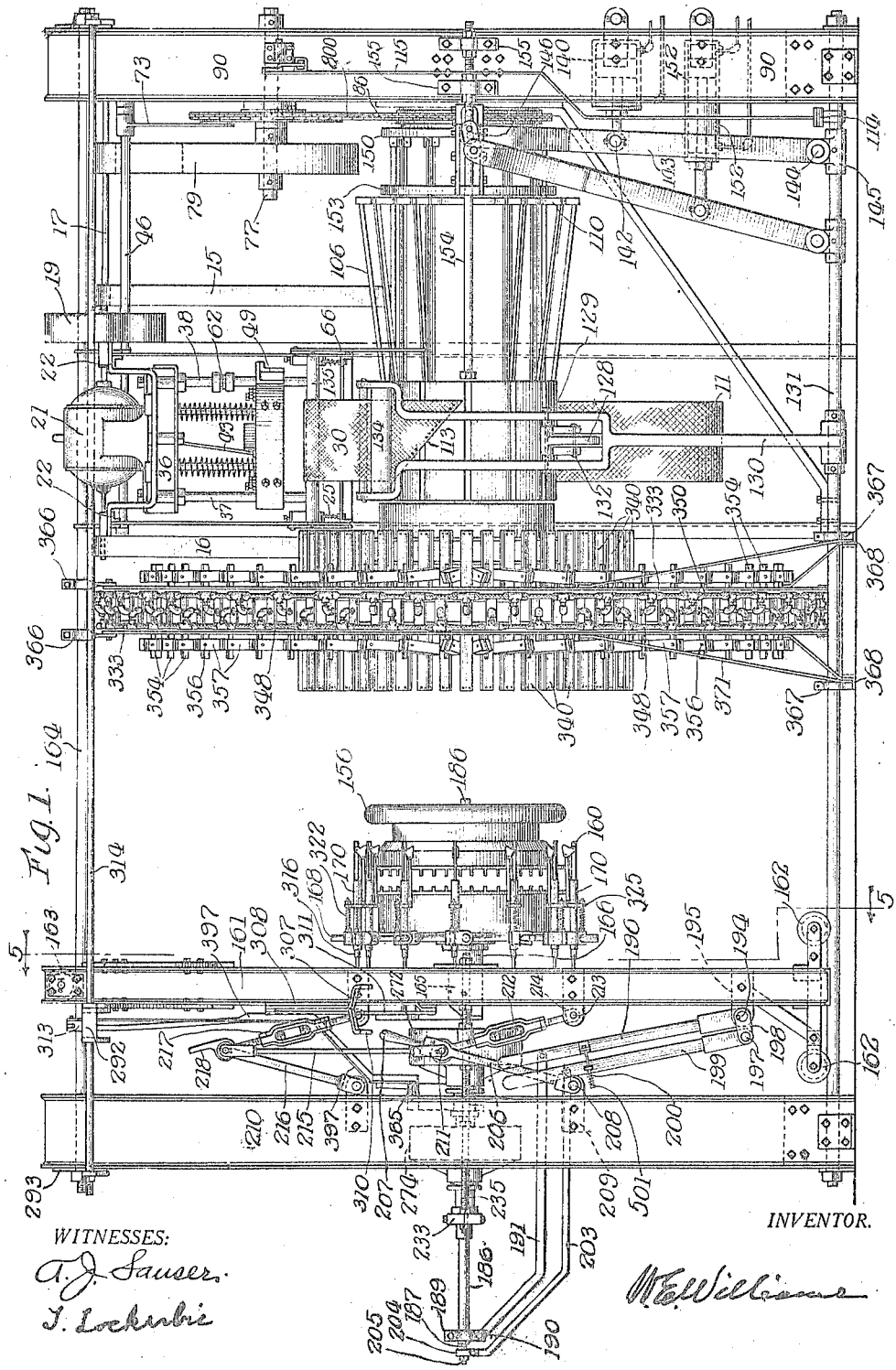

The shear is operated by the springs 42 which are contracted under the influence of the mechanism before described through the medium of the rocker shaft 46 which is controlled by the lever 73 which carries a small roller 74 riding on a cam surface 75, see Figures 29, 30 and 31 Sheet 19, which is fixed to a sprocket wheel 76 that is intermittently driven from a shaft 77 through the medium of a clutch which I will describe later. The shaft 77 is continuously driven by means of a belt wheel 78 and belt 79 from a pulley 80 on shaft 17 driven from the motor as before described. The sprocket wheel 76, and hence the cam surface 75, are connected by the chain 800 to the winding drum upon which the rings of fabric are made and the cam surface 75 is so located about the shaft 77 that the abrupt portion 81 of the cam allows the roller 74 to drop suddenly and thus permit the springs 42 to actuate the shear and suddenly cut the fabric at the exact moment when the right amount of fabric for a single ring has passed across the shear line out of the loop 11 as before described. The winding drum, or perhaps a better term would be the sizing drum for the fabric, is shown in end view by Figure 15 Sheet 13 and is also shown in Figure 1, Sheet 1, Figure 2, Sheet 2, Figure 10, Sheet 10, and Figure 11, Sheet 11. This drum is composed of a series of blocks 82 and 83 which are usually made of wood and have a circumference or periphery the right length for the ring of fabric to be formed thereon. The blocks 82 and 83 are secured to a steel drum 84 which is mounted at the left end on a spider 85 and extends back to the right and is secured to a sprocket tooth ring 86 best shown in Figures 10 and 11 Sheets 10 and 11. The ring has a flange 87 that bears on a fixed ring 88 fixed to some plates 89 which embrace the ring 88 and are secured to the channel posts 90 composing the right end frame of the machine.

The ring 88 is fastened to another drum 91 which is stationary and serves only to support an end spider wheel 92 into which there is screwed a pipe 93 the left end of which becomes the bearing axle for the spider 85 which supports the outer end of the drum 84. A nut 94 screwed onto the end of the pipe 93 holds the spider 85 from moving to the left off of the end of the pipe 93.

Blocks 83 are arranged so that there is a space between the companion blocks into which there is mounted a set of Z shaped cam bars 95 which are hinged at 96 to blocks 97 riveted to the drum 84 by rivets 98. The cam bars 95 project through slots in drum 84. Extending longitudinally through the blocks 83 there are slots 99 which furnish tracks for small rollers 100 to ride upon. There are three sets of these rollers 100 the outer ones riding in the slots 99 and the inner one is in contact with the under side of the cam bars 95. The rollers 100 are mounted on pins 101 that pass through the ends of rods 102 which extend back and are connected at 103 to brackets in a sliding ring 104. The ring 104 slides right and left on the right end of the drum 84 and revolves with the drum.

In the left end of the cam bars 95 there are mounted small rollers 105 which are embraced between the two pieces which form each cam bar 95 and are in contact with a series of bars 106 and the ends of these bars 106 are embraced by the ends 107 of the cam bars 95 as indicated in Figure 10.

At the right end of the bars 106 they are hinged at 108 to brackets 109 to a sliding ring 110 which slides back and forth lengthwise of the drum 84 through a distance equal to the distance from the center line of the fabric, as wound on the drum 84, to the center line of the core when in position at the center of the stitching finger wheel. A coil spring 111 in the form of a continuous band extends around the outside of the series of bars 106 and holds the left ends of the bars always down into contact with the rollers 105. Vertical slots 112 in the blocks 83 permit the roller pins of the Z cam bars 95 to move radially when the cam bars 95 move outward about the hinged pins 96.

When the ring 104 is moved along the drum 84 to the left it pushes the rollers 100 in contact with the cam bars 95 and thus causes them to move about the hinges 96 and move outward the rollers 105 and carry with them the left ends of the bars 106 to the dotted position shown in Figure 10 Sheet 10, and thus carrying with it the ring of fabric that has previously been formed around the periphery of the blocks 82 and 83 thus expanding the fabric ring to the right size to be applied over the core.

After the bars 106 have been expanded out to the dotted position, having on their ends the ring of expanded fabric, the ring 110 is moved to the left along the drum 84 causing the bars 106 to slide on the roller 105 of cam bars 95 and thus carry the ring of fabric into position to be applied to the core.

The rings 104 and 110 revolve with the drum 84 when the latter is revolved through the medium of the sprocket ring 86 which later is driven by the sprocket chain 800 from the sprocket wheel 76 as before mentioned at the intervals when the cloth is being wound around the drum as before indicated.

In starting the fabric sheet 30 to wind upon the drum the operator leans forward and catches the end of the fabric with his fingers at the shear blade as before mentioned and pulls it forward and sticks it down on the drum as indicated by 113 Figure 1. Some small sharp needle points protrude from the blocks 82 and 83 at this particular point along the edge of the bias cut of the fabric and thus hold the end of the fabric to the drum sufficiently that upon the travel of the drum it will pull forward the fabric by reason of the engagement of the points with the fabric. These points are not shown in the drawing save only by the dots indicated on Figure 1.

After the operator has secured the end of the fabric to the points on the drum, as indicated, he puts his foot on the foot treadle 114 shown at the lower right hand corner of Figure 1 and at the left of Figure 4 Sheet 4, and thus pulls down the rod 115 which is connected with the bell crank 116 hinged at 117 to a bracket 118 on one of the rear frame posts 90, see also Figures 29, 30 and 31, Sheet 19. The lower arm of the bell crank is connected at 119 to a rod 120 which is connected to a lever 121 hinged at 122 to a bracket 123 fixed to one of the posts 90. The lever 121 has a projection 124 and a shoulder 125 which operates to engage and disengage a clutch block 126 shown in dotted lines in Figure 31 Sheet 19 which under the control of a spring 127 operates to engage the constantly running shaft 77 and cause the sprocket 76 to revolve and carry with it through the medium of the chain 800 the sprocket ring 86 with its drum 84 and all of its connected parts thus winding the fabric on the drum as it is drawn over the shear.

As soon as the winding drum has been started to revolve by means of the treadle 114 as before described, the operator causes a roller 134 to come into contact with the fabric on the drum and press the same tightly to the drum as the cloth is wound thereon, see Figure 4 Sheet 4. This roller 134 is mounted in the upper end of a post 130 the lower end of which is hinged on one of the rods 131 which forms the lower cross frame members. The post 130 is moved forward as desired by the hand of the operator controlling the hand lever 128 hinged at 129 to the post and connected at 132 to a link 133 hinged on the opposite lower cross frame member 131. Thus severe pressure may be applied to roller 134 and cause it to roll down tightly the splice of the fabric when the two ends meet and overlap on the completion of the revolution of the drum.

At the right interval of time after the start of the winding of the strip on the drum the cam surface 81 of the cam 75 as before mentioned allows the shear to operate and cut the fabric off the right exact length for a complete ring of fabric and then upon the further revolution of the drum the roller 134 presses down the end of the fabric as it comes along and sticks it to the end which has been held by the pins as before described and thus completes the forming of the ring of fabric on the drum.

At the moment that the shear is operating the fabric strip is in motion and for an instant that part of the fabric at the cutting edge is stopped and during this time a roller 135, see Figure 1 Sheet 1, Figure 4 Sheet 4, and Figure 25 Sheet 17, over which the strip travels, is drawn down by the tension of the fabric and thus lessens the shock of tension on the moving strip at the moment of cutting off the strip.

The roller 135 is mounted on arms 136 hinged at 137 to frame members 27 and is held up to normal position by springs 138 over curved rods 139.

With a complete ring of fabric wound on the drum as described the next step is to expand this ring of fabric and apply it to the core.

This is accomplished by moving the ring 104 to the left longitudinally of the drum 84 and thus through the medium of the rollers 100 push out the Z cam bars 95, see Figures 10, Sheet 10, 11, Sheet 11, and Figures 15, 16, and 17 Sheet 13 and they in turn push out the ends of bars 106 which expand and carry with them the ring of cloth on the ends of the bars.

Figure 2:
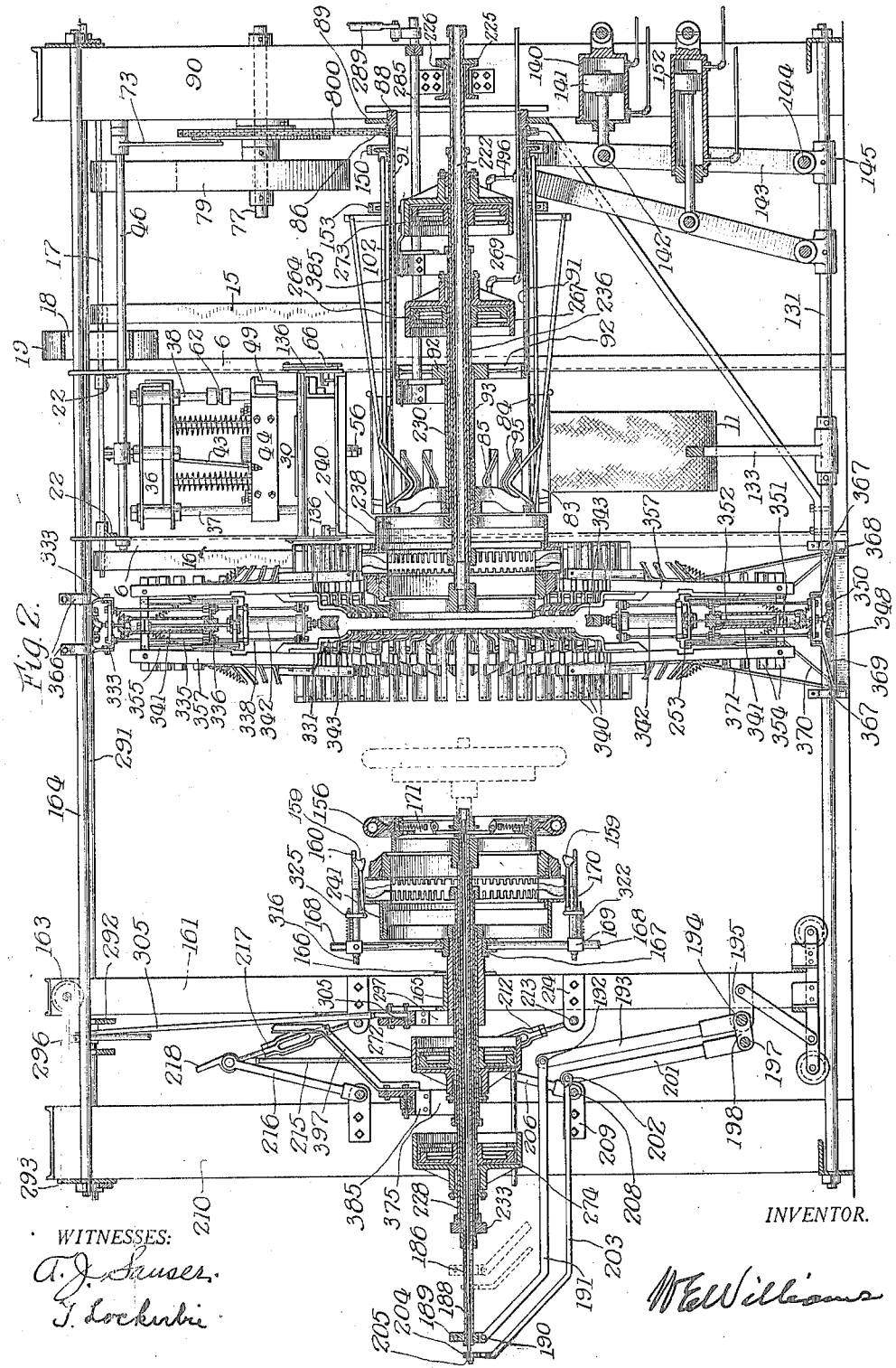

The movement of ring 104 is accomplished by the compressed air cylinder 140, see Figures 1, 2, Figure 4 Sheet 4 and Figure 17 Sheet 13. The air actuates a piston 141 connected to the ring 104 by mechanism as follows:

The rod of the piston is connected by a rod 142 to a two armed lever 143 hinged on a cross rod 144 to blocks 145 on the cross frame rods 131, and with its arms 143 connected to links 146 connected at 147 to cross head blocks 148 sliding on fixed frame rods 149 which serve as guides for the cross head blocks.

The cross head blocks 148 carry a yoke 150 made in two pieces that embrace the ring 104 and engages its rim through the medium of the contact pieces 151.

Thus the movement of the piston 141 expands the ring of cloth fabric on the bars.

The bars 106 are moved to the left along the drum 84 by the compressed air cylinder 152 operating through a similar set of mechanism as that described for cylinder 140 and connected to the ring 110 by a yoke 153.

The guideway rods 154 for the cross heads of yoke 153 together with rods 149 are connected to blocks 155 secured to the frame members 90 and may be adjusted as to limit the length of the travel of the cross heads of the yoke 150 and 153.

The iron core upon which the carcass is built is indicated by 156 and the forward position of movement of rods 106 when they have carried the expanded ring of fabric into position to contract onto the core, is shown by Figure 43, Sheet 23.

In this view the rods 106 are shown as cut away at 157 for purposes of clearance space over the core. This cutaway position is not indicated in other figures in order to save confusion in views.

In position shown in Figure 43, the ring of fabric is indicated as 300 to distinguish it from the strip of fabric 30, out of which it is formed, and in this position the edge 158 of the ring 300 is within the mouth of some jaws 159 and 160 of what I call gripping fingers which are shown in detail in Figures 36 to 40 inclusive, Sheet 21, and are operated by compressed air as will be described later.

Upon the arrival of the fabric ring 300 to position of Figure 43, the jaws 159 and 160, are actuated to grip the edge 158 of the fabric and securely hold it in position to fit the core, while the rods 106 are withdrawn to retreated position ready for receiving a new ring of fabric.

After the rods 106 are retreated from position of Figure 43, the fabric ring 300 assumes position shown in Figure 44 and upon release of gripping finger jaws 159—160 it assumes the position shown in Figure 45 where it is ready to be stitched down around the core 156.

Before proceeding with the stitching operation I will describe the gripping fingers and the means of sustaining the core in place.

At the left of the machine Figures 1, 2, Sheets 1 and 2, Figure 14, Sheet 12, Figures 32, 33, and 35, Sheet 20, there is a movable A frame 161 composed of channel bars bound together at the top and bottom and mounted on rollers 162 adapted to roll on the lower cross frame members 131 and on a roller 163 mounted to run on the upper cross frame member 164. A central cross head 165 binds the channel members together at the center and at the same time furnishes a central hub 166 which becomes the main support for some of the main working parts of the machine. On the right end of hub 166 there is a secondary hub 167 which carries 42 spider arms 168 see Figure 6, Sheet 6, upon the ends of which are mounted blocks 169 into which are mounted the body of the gripping fingers as indicated by 170, see Figures 36, 37 and 38, Sheet 21.

The core 156 is mounted on a spider 171 see Figures 22, 23, Sheet 16, which is composed of four arms connected together by tie bars 172 and are provided with contact faces 173 and abutting shoulders 174. The core is slipped over the ends or contact faces 173 of the spider from right to left and it is held in place by the catches 175 which are hinged at 176 at the shoulders 174 of the spider. The catches 175 are held into engagement by the springs 177 sliding over the eye bolts 178 which are hinged to the catches and slide through holes in projections 179 in the arms of the spider. The catches 175 are disengaged from locking the core in place through the medium of the links 180 connected at one end to the catches 175 and at the other end to levers 181 hinged at 182 to the arms of the spider and these levers 181 are connected to other links 183 which project down through the hub 184 of the spider and terminate in beveled ends 185 on the interior of a hollow shaft 186 upon which the hub of the spider is mounted. A rod 187 which slides on the interior of the tube 186 and which is provided with a beveled shoulder 188 is adapted by longitudinal movements to actuate the levers and links before mentioned and disengage the catches 175 from holding the core onto the spider. The tubular shaft 186 extends backward along the axis of the cross head hub 166 and is engaged by a block 189 see Figures 1, 2 and 14, the latter being on Sheet 12. The block 189 is connected at 190 to a link 191 which is connected at 192 to a lever 193 see Figure 5 Sheet 5, to a shaft 194 which extends across the frame 161 and is journaled in boxes 195 fixed to the said frame. A hand lever 196 is connected on the shaft 194 at the outside of the frame for the purpose of being conveniently operated by the hands of the operator.

A secondary shaft 197 is carried by blocks 198 secured to the shaft 194 and carried thereby, this shaft 197 is provided with a hand lever 199 which is held in normal position to the hand lever 196 by a spring 200 sliding over a bolt 501 connected to a bracket on the lever 196. Thus the shafts 194 and 197 normally move together, that is when the lever 196 is moved with its shaft 194 it carries with it the lever 199. To the shaft 197 there is fixed the lever 201 see Figures 2 and 5, which is connected at 202 to a link 203 connected at 204 to the end 205 of the rod 187 before mentioned as operating to disengage the catches 175 that hold the core on the spider before mentioned. Thus by the movement of the lever 196 the position of the core in relation to the other parts may be changed from that of Figure 1 to the dotted lines of Figure 2 and by pulling the lever 199 apart from the lever 196 the rod 187 is moved to disengage the catches 175 in the manner previously described and this facilitates the replacement of cores on the supporting spider as indicated and this disengagement may be accomplished in any position of the sliding carriage 161.

Figure 3:
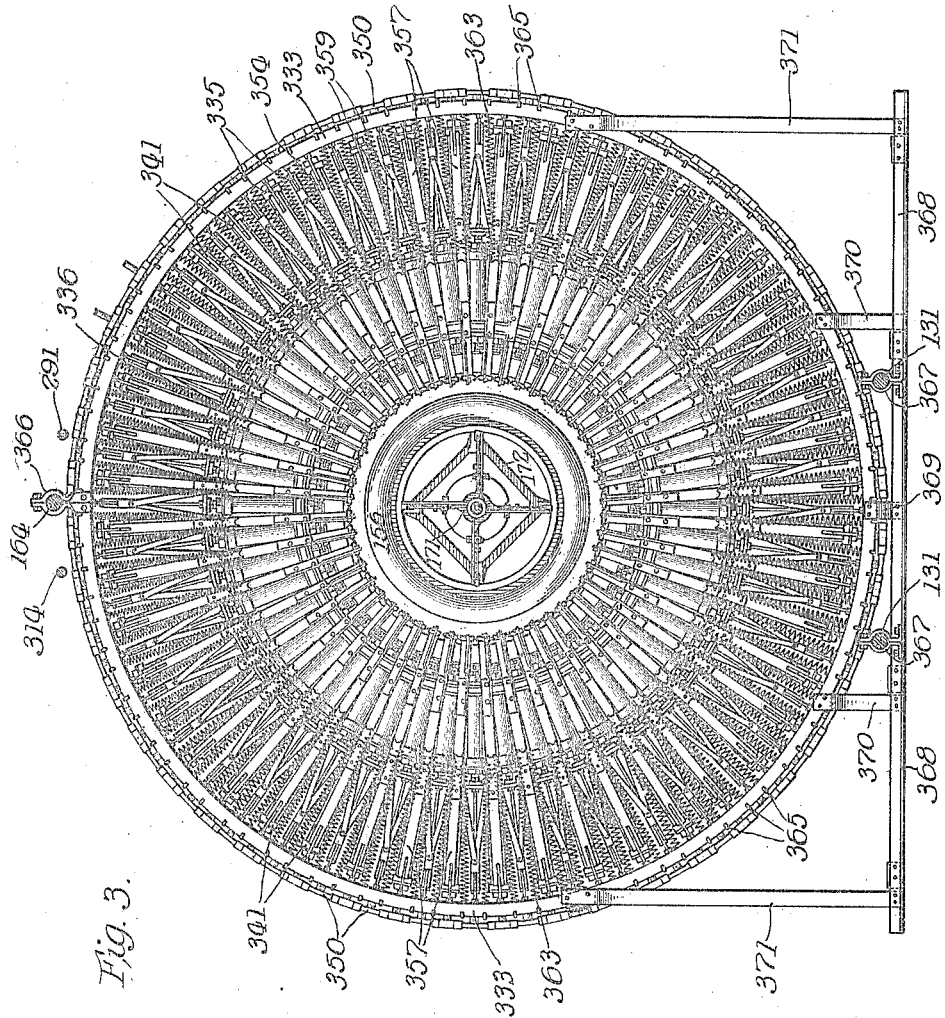

The carriage 161 is moved right and left as described from an extreme right position, at which the core is central of the stitching wheel which central position is shown in Figure 3 Sheet 3, Figure 8 Sheet 8, Figure 9 Sheet 9, Figure 41 Sheet 22, and in Figures 42 to 54 inclusive, to the extreme left position shown in Figure 1. Any suitable means may be employed for moving this carriage but I have here shown it as being operated by a double set of hand levers 206 provided with the handles 207 and connected onto a cross shaft 208 journaled in blocks 209 secured to the channel end posts 210. The levers 206 are connected by pins 211 to turnbuckle links 212 hinged at 213 to blocks 214 secured to the movable frame members 161. Vertical rods 215 connect a duplicate set of levers 216 and 217 similarly connected as are the levers 106 and 212 to the frame members and act in unison in moving the movable carriage and its parts as described.

The levers 206 and 212 and the upper corresponding levers are in a position a little below horizontal when the core is in position in the stitching wheel ready for stitching the fabric to the core and thus the thrust of the air cylinders carried by the movable frame is carried by the lever system back to the left end frame 210. The ends 218 of levers 217 and 212 project and overlap levers 216 and 206 and arrest further downward movement after just passing the central position.

When the core is in stitching position it is sustained against side thrust in either direction by two flanged wheels 219 and 220, see Figure 41 Sheet 22, Figures 14 Sheet 12, 12 Sheet 12, 11 Sheet 11, each having flanges that abut against the sides of the core casting. The wheel 219 is carried by a hollow shaft 222 into the end of which is fixed a plug 223 that serves as an extension of the shaft 222 into the hub 224 of wheel 219. The hollow shaft 222 extends to the right and is secured from endwise displacement by two clamping blocks 225, see Figures 10 and 11 that fit into a circular groove in the shaft 222 and are screwed to cross members 226 of the right end frame 90.

The wheel 220 with its hub 227 is fixed on the end of a hollow shaft 228 and in place of the plug 223 as carried in the end of shaft 222 I arrange a thin tube 229 which acts as an extension for the shaft 228 through the hub 227. The shaft 228 at the left side extends back to a cross bar 233 see Fig. 14 Sheet 12 composed of two bars bolted together and provided with an aperture between them that fits into a circular groove 234 in the shaft 228 and this holds it from longitudinal displacement. The cross bar 233 is secured by nuts on the ends of threaded rods 235 that are secured by nuts into cross head 165 and thus the end thrust of all the parts that are secured to rods 235 is transmitted to the movable frame 161 through the cross head 165.

On the outside of shaft 222 at the right of Figure 41 there is another hollow shaft 230, and outside of shaft 228 at the left there is a similar hollow shaft 231. These shafts 230 231 and their operating parts are used when the machine is arranged to stitch fabric over the beads and they remain idle when stitching the inner layer of fabrics. In Figures 1, 2, 8, 9, 10, 11 14, and 41 to 48 inclusive these shafts and their operating parts are idlers. On the ends of shafts 230 and 231, there are guide collars 232 used only when those shafts are idlers.

On the outside of shaft 230 and 231 there are hollow shafts 236 and 237 which support spoked wheels 238, 239 upon the rims of which there are fixed flanged cam rings 240 and 241 which are connected across at intervals by blocks 242, 243, (see Figures 6 and 41) to a secondary set of flanged rings 244, 245 to which are secured the elastic faced dies 246—247. On the inner side of the rings 240—241 there are supplemental flanged rings 248 and 249 and on the inside of rings 244 and 245 are other supplemental flanged rings 250 and 251.

Radially extending flanges 252, 253, 254, 255, 256, 257, 258, and 259, Figure 41, form the cam tracks 260, 261, 262 and 263 which guide the rollers 264 and 265, see Figure 8 Sheet 8 of the stitching fingers. Shaft 236 extends to the right see Figures 10 and 11 and is screw threaded in the hub of a piston 264 suitably packed at 265 by packing and a clamping ring 266 into an air cylinder 267. The right end of shaft 236 is smaller than the threaded portion in the piston hub and is smooth and passes out through a stuffing box 268 provided with packing and a gland to prevent leaking around the shaft as it passes out of cylinder 267. A pipe 269 supplies compressed air and vacuum as required to move the piston 264 to the right or left as desired. The cylinder 267 is secured from displacement by the screw threaded rods 270 which extend back to the cross head 226 of the rear frame through the medium of the nuts on each side of the blocks 271 and the rods 270 are also secured by nuts to the wheel 92 on the end of supporting drum 91.

By moving the piston 264 to the right or left by air and vacuum the wheel 238 together with the dies and cam tracks as described are moved to and from the sides of the core 156 as required in the work. The shaft 237 at the left of the machine see Fig. 14 Sheet 12 is controlled by a cylinder 272 and piston construction substantially like the arrangement at cylinder 267 and is supported by the rods 235 in a similar manner.

The shafts 230 and 231 are also provided with cylinder and piston equipment similar to the cylinders 267 and 272 as indicated by 273 and 274, which actuate the said shafts 230 and 231 when supporting wheels are placed on their ends in place of the collars 232 as will be described.

In the operation of the machine the dies 246 and 247 and cam tracks 260, 261, 262 and 263 are moved to several positions as required to properly perform the work and for the purpose of controlling the exact location of the positions of those dies and cam tracks I provide some stops in the form of blades as is indicated by 275 in Figure 12 Sheet 11. Two of these blades are provided for each piston, see Figure 18 Sheet 14, and they are provided with the cam surfaces 276 which work against small rollers 277 which are mounted in slots of studs 278 which are connected at 279 to the piston 264. Collars 280 on the studs 278 lie between the back edge of blades 275 and the front edge of the wheel 92 which forms the front end of the supporting drum 91. A yoke 281 see Figure 18 connects the two blades 275 together and this yoke is provided with a pivot pin 282 which works in a slot 283 of a rocking lever 284 on a shaft 285 mounted on bearings 286 on the side of cylinders 267 and 273.

The shaft 285 extends to the outside of the right frame 90 of the machine and is then supported by a bearing 287 and is connected to a lever 288 that is connected to a rod 289. See Figure 10 Sheet 10, Fig. 4 Sheet 4, which extends upward and is connected to a lever 290 on an operating shaft 291 supported in suitable bearings on the frame at the top of the machine.

The shaft 291 extends over the top of the stitching wheel and is mounted to slide through bearings 292 in the movable frame 161 and extends back to a bearing 293 on the end frame 210, a hub or collar 294 takes end thrust of shaft at this end and the arm 290 takes thrust at the other end. See Figs. 32 to 35. This shaft 291 has a feather way 295 to permit a lever 296 to slide along but not to turn around the shaft 291 as the movable frame 161 is moved to and from the stitching wheel. The stops 275 for the movement of the pistons as shown in Figure 12 Sheet 11 are substantially duplicated at the left of the machine as indicated by Figure 11 Sheet 12 and Figure 5 Sheet 5 wherein 297 indicates the blades corresponding to those of 275 as before mentioned. These blades 297 work against collars 298 on tubes 299 which are slotted to permit the blades to pass through and are secured by nuts 301 into the cross head 165 and the blades 297 on their cam faces work against small rollers 302 in slots of studs 303 secured to the piston of the cylinder 272 which moves the shaft 237. A yoke 304 Figure 5 is connected to a rod 305 to the lever 296 before mentioned as mounted on shaft 291 and a secondary rod 306, is connected also at the lever 296 and extends down to a hand lever 307 by which shaft 291 and the cam or stop blades 275 and 297 are operated as desired. The hand lever 307 is held in position by being secured to a segment 308 at the different positions desired by pins 309. A similar lever 310 to that of 307 likewise under the control of a segment 311 similar to the segment 308 is connected to a rod 312 connected to a lever 313 which is mounted on a shaft 314 and secured thereto by a feather way 315. The shaft 314 acts in the same capacity as the shaft 291 for controlling the stop blades which are provided for the pistons of the cylinders 273 and 274 for the shafts 230 and 231, in the same manner and for the same purpose as described for the stop blades 275.

At the right of the machine within the supporting cylinder 91 see Figures 10, Sheet 10, 11, Sheet 11, 19 Sheet 14, there is arranged the stops and connecting mechanism for cylinder 273 in a similar manner to that of cylinder 267. The stop blades for the positions of the pistons of the cylinders 273 and 274 are indicated in Figure 13 Sheet 11 by 375 and they work between collars, 376 on slotted tubes 377 secured in stationary positions at 378 into walls of cylinder 267, 272 and rollers 379 in the slotted ends of studs 380. The studs 380 are connected to the pistons at 381. Some springs 382 are shown outside of studs 380 and springs 383 outside of studs 278 and springs 384 inside of tubes 299 which assist vacuum in moving the pistons home or in retreat positions.

At the right side of the machine a yoke 385, Figure 19, connects the two blades 375 together and this yoke is provided with a pin 386 which engages a slot 387 in a lever 388 on a shaft 389 by which the blades 375 are operated.

The pin 386 is engaged by a guideway slot 390 in bracket 391 secured to the cylinder 273.

The shaft 389 is supported by a box 392 inside of drum 91 and at the other or outside end at the right, see Figure 4, by a box 393 in a cross bar of the frame and at this point the shaft 389 is connected to a lever 394 connected by a rod 395 to a lever 396 on shaft 314 controlled by the operator as before described.

An air pipe 196 connects cylinder 273 to the power supply. At the left side of the machine the yoke 385 is connected by a bent bar or rod 397, see Figures 1, 2, 5, 32, 33 and 35 to the lever 313 before described.

Thus the operator at the movable frame 161 by working levers 307 and 310 adjusts the limits of the movement of the pistons of the cylinders to suit the positions of the dies 246 and 247 and cam tracks 260, 261, 262, 263 to meet the requirements of the stitching operations. The gripping fingers 170 having the jaws 159, 160, see Figure 6 Sheet 6, Figure 14 Sheet 12, and Figures 36 to 40 inclusive Sheet 21, are operated by compressed air supplied by small tubes 316 from any suitable source of supply.

The jaws 159 are opened by springs 317 within the tubes 170 pushing back the pistons 318 which are driven forward by air pressure when desired and the pistons are connected to the jaws by the pins 319 connected to links 320 connected at 321 to jaws 159.

The tubes 170 slide freely endwise within their bearings in the blocks 169 under the control of compression springs 322 sliding on rods 323 secured at 324 into blocks 169 and the front end of rods 323 slide freely through holes in clamps 325 which are adjustably secured by screws 326 to the tubes 170.

The springs 322 hold the tubes out to the position determined by the adjustment of the nuts 327 on the rods 323.

The purpose of the construction which permits the tubes 170 with their gripping jaws to be pushed to the left against the resistance of the springs 322, is to secure exact registration of the ring 300 of fabric on the core as it is delivered into the jaws 159 160 by the bars 106 see Figures 43, and 44, Sheet 23.

The bars 106 deliver the fabric ring 300 a little beyond the registering center lines in order that any slight misplacement of the ring of fabric or any portion of it on the bars may still be delivered into the bottom of the throat of the jaws. That is, the slack portions may just touch the bottom of the throat of the jaws while the flush portions will touch the bottom and then push back the tubes 170 compressing the springs 322 as mentioned. And then as the bars 106 withdraw while the jaws are closed on the fabric all tubes 170 will line up against the nuts 327 and thus register the ring 300 of fabric exactly on the core as desired.

The stitching or shaping mechanism is substantially a stricture spring or rather a series of springs forming two complete rings on each side of the core, see Figure 3 Sheet 3, Figure 6 Sheet 6, Figure 7 Sheet 7. Figure 8 Sheet 8, and Figures 20 and 21 Sheet 15.

These springs are indicated by 328 and they are held in sockets 329 in the rounded ends 330 of stitching fingers 331.

The springs are in extension and bottom on the division walls 332 of the sockets 329. Figure 20 Sheet 15 shows the position of the parts, when the fingers are retracted from the core. Figure 21 shows them when contracted at the end of stitching or shaping operation. In Figure 6 Sheet 6, the stitching mechanism is at its lowermost point or the end of the stitching operation while in Figure 3 Sheet 3, they are in raised position before the stitching operation, and in this position will clear the outer circumference of the core. The stitching fingers are operated simultaneously on both sides of the core all around the circumference and the operating means for this, I call the stitching wheel.

The wheel is composed of a suitable frame work, see Figures 7 Sheet 7, 8 Sheet 8, 9 Sheet 9, composed of the ring members 333 in the form of two angle sections connected across to each other by blocks 334. The members 333 are connected by radial rods 335 to other ring members 336 of rectangular section connected to each other by blocks 337, which are connected by radial rods 338 to other rectangular section ring members 339 which are connected to each other by the bars 340. Supported by the ring frame members as described, are two sets of compressed air cylinders 341 and 342.

The cylinders 342 serve to push down a series of pads or blocks 343 of rubber or other elastic material onto the tread of the core, see Figures 49 to 52 inclusive, Sheets 24 to 26 inclusive, for the purpose of compressing the layers of fabric at the tread sections. The blocks 343 are connected to blocks 344 which are connected to the piston rods 345 and are actuated by the pistons 346 by air or vacuum supplied by the pipes 347 connected to the circular supply pipe 348 which is made up of a series of T's connected together by short pieces of hose and are connected at desired intervals to the supply mains.

The cylinders 341 are connected by pipes 349, Figure 9. Sheet 9, to a circular supply pipe 350 made up in the same way as pipe 348.

The pistons 351 of cylinders 341 are connected by their rods 352 to cross heads 353 which slide on rods 338 and are connected back to cross heads 354 by the links 355 and the cross heads 354, at the hinge pins 356, are connected to arms 357 that carry the stitching fingers 331.

In order that the pistons of cylinders 341 are moved in unison I arrange an equalizer system composed of a series of cross heads 358 sliding on the rods 335 and pipes 347. The cross heads are connected by the links 359 to the cross heads 353 at the pins 360 at which point the links 355 are also connected. Blocks 361 on arms 357 rest on frame rings 339 when the arms are in position of clearance as indicated in Figure 9.

Angle bars 362 bolted to arms 357 carry rollers 264, 265 which engage cam tracks 260, 261, 262, 263, as the stitching fingers come into action on the cloth and guide the fingers as desired, as will be described later.

The pistons of the cylinders 341, 342 are operated in doing their work by compressed air and they are retracted by vacuum from the same system of pipes up to the point where the cut-off valves are located to supply either pressure or vacuum.

To aid in holding the stitching fingers in place I provide some tension springs 363 connected to brackets 364 secured to the arms 357 and the springs are cross connected to hooks 365 to the angle frame rings 333 Figure 8.

As the stitching fingers are pushed forward in doing their work of forming the fabric on the core, the springs 363 increase in their tension and cause the stitching fingers to press their ends 330 against the fabric with increasing pressure. On the return stroke the springs 363 assist the vacuum in the return of the parts to clearance positions. The arms 357 are guided laterally by the projecting ends of cross bars 340.

The stitching wheel frame rings 333 are connected by clips, 366, see Figure 3, to cross frame bar 164 and by clips 367 to lower cross frame bars 131.

The wheel itself is supported on its own base frame members 368 through the posts 369, 370, and 371.

The general air and vacuum supply pipes and the valves for operating them are not shown as they may come from any location desired from any suitable source of supply. The several steps of stitching down the fabric to the core are illustrated in Figures 42 to 54 inclusive Sheets 23 to 26 inclusive as follows:—

The elastic faced dies 246 and 247 perforr double function. First they hold bacl the skirts 372 of the fabric ring 300 see Figures 44 and 45, while they are being formed or stitched down on the core to prevent the skirts buckling and forming puckers which ordinarily frequently occur with former methods of stitching. Then after the fingers have completed their work and retreated to clearance position the dies are forced by pressure of the cylinders to contact with the fabric on the core and firmly press the several layers together and to the core.

The stop blades 275 297 and 375 are set by the operator by the hand levers as described at the right intervals to control the movement of the pistons in cylinders 267, 272, 273 and 274, to set the dies and cam tracks to right positions for each operation as described herein.

In Figure 42 the parts are shown in the position at the completion of the retreat of the stitching fingers which is the position of the pistons of cylinders 267, 272, 273 and 274 as shown in Figures, 10, 11, 12, wherein all of the pistons as mentioned, are in retreat to their limits.

The next step is to actuate the dies to press the sides of the fabric on the core as is indicated by Figure 48. Then the stop plates 275 are set to meet the position of Figure 43 and the pistons are retreated by vacuum to bear on the stops till the dies 246, 247 are registered as in Figure 43 to act as holdbacks for the skirts of the fabric ring. Then the bars 106 deliver a fresh ring of cloth 300 as before described, and the gripping fingers register it on the core as per Figure 44.

Upon release of the gripping fingers the stitching finger cylinders of the stitching wheel actuate the fingers to advance into contact with the fabric as indicated by Figure 45 at which point the rollers 264 and 265 enter into the outer end of the cam tracks 260 and 261. Upon inward movement of the stitching members the cam tracks guide the arms 357 to cause the ends 330 of the fingers 331 to follow the contour of the core sides and form and stitch the skirts of the fabric to the core. The completion of the stroke is shown by Figure 46.

Before the stitching fingers begin their retreat the dies 246, 247, and cam tracks are retreated by vacuum in the cylinders 267, 272 to the position of Figure 47, which brings the cam tracks 262, 263, into contact with the rollers 264, 265, thus holding the stitching fingers clear of the stitched fabric on the return or retreat movement of the fingers.

At the commencement of the stitching finger movement at stitching, the pads 343 are pressed into contact with the tread portions as indicated by Figure 45 and they remain into contact until the fingers are clear of the fabric as shown by Figure 47, and they are then retreated as indicated by Figure 48.

The pads 343 and their actuating mechanism are not wholly essential but better work is obtained with them.

With this method of making carcasses the desirable system is to employ two machines, one of them adapted to apply the fabric on the core for the plies that lie under the beads and then remove the core with those plies to a second machine and in the interval, before the core with the first plies are placed in the second machine, apply the beads.

In order to show both of these operations in this case, I have herein shown all the operating mechanism for the second machine which applies the fabric on the outside of the beads and have previously described all of these parts excepting as to what is shown in Figures 49 to 54 inclusive Sheets 25 and 26.

The beads of the tire carcass are shown as 373, Figures 49-54 and to bring about the stitching of the fabric underneath the beads in the throat of the core section it is necessary to add some mechanism not previously described as follows.

In place of the idle collars 232 on hollow shafts 230, 231, Figures 10, 11, 14 and 41, I place wheels 374 of which I show only sections of rims as indicated in Figures 49 to 54 inclusive.

In order to get these parts in place, I remove the rings 248, 249, 250 and 251, see Figures 41 and 42, and their connected parts which include some wooden die rings 398 and their rubber facing rings 399 and I substitute for the rubber facing ring 400, the rounded nosed ring 401, see Figure 50. I fix to rims of wheels 374 a bead stitching die ring 402 provided with the nose piece 403, Figure 50, and to the back margin of this ring 402 I arrange a series of radial flanges 404 which in connection with radial flanges 405 on rim of wheels 374, forms a cam track or slot 406. On flanges 221 of wheels 219—220 I place holdback rings 407. On the inside die rings 402 I place clamping rings 408 held in position by bolts 409 and springs 410.

The slots 406 are adapted to embrace rollers 264, 265 and thereby guide the stitching fingers whenever the slots 406 are in the right position of registry to embrace the rollers 264—265 in the orderly sequence of the work.

The steps of placing the rings 300 of fabric in position for stitching, are the same for the layers over as for those under the bead and the stitching operation is the same down from the tread of the carcass to the top of the bead. The progress to this point is shown by Figure 49. The changes in the positions of the dies and cam tracks from those of Figure 49 to those shown in Figure 51 are indicated by Figure 50, which permit stitching fingers to move down from position of Figure 50 to that of Figure 51 which pushes the skirts of the fabric 372 down along the outside of the holdback rings 407 ready to be stitched home by the bead stitching ring die noses 403.

The next step is indicated by figure 52 which differs from positions of Figure 51 only in that the stitching fingers are pulled back and away from the fabric ready for the retreat of the stitching fingers.

The next step is indicated by Figure 52 wherein the stitching and holdback dies above the bead are in contact under pressure with the sides of the carcass above the bead and the noses 403 of the bead stitcher rings 402 are in position to commence acting on the skirts 372 of the fabric which latter are now embraced between the holdback rings 407 and the clamping rings 408.

From positions of Figure 53 to that of Figure 54, the bead stitching rings 402 with their noses 403 only have moved drawing the skirts 372 from within the pinch of the rings 407 and rings 408 and stitching it home under the head completing the work as desired.

From Figure 54 the dies are retreated to positions ready for another layer of fabric to be applied to the core or carcass.

In the changing of cores as required the movable frame 161 is moved back and forward from the stitching wheel from position of registry shown by Figure 41 to the position shown in Figure 1.

For purposes of inspecting and correcting faults in the stitching of the fabric the core can be shifted as shown by dotted lines in Figure 2 wherein its supporting shaft 186 is moved horizontally by means of the hand lever 196.

It will be observed that as the stitching members are forced between the die faces 246 and 247 and the core, the outer edges or fabric skirts are held back by the sides of the dies so that the stitching device operates in the base of a fold or bight of the fabric. This operation is well illustrated in Figure 49, and serves to give the fabric the radial stretch required to enable it to conform, without wrinkles, to the decreasing circumference of the core as it approaches the center of the core.

For purposes of simplicity in the claims I will use the term stitching wheel which when so used will mean a mechanism that moves radially to stitch down simultaneously the entire periphery of the carcass.

For antecedent to terms that will appear in the claims I call a "carrier" the two small rollers and their connecting belt that support and unwind the fabric roll. A single roll might serve the purpose but I prefer to use the construction shown.

The winding drum or the equivalent mechanism that draws forth the strip of fabric may be termed a take-up for the fabric strip.

What I claim is:—

1. In a tire carcass forming machine the combination of, a stock fabric feeding device, a fabric cutting device, a fabric ring forming device, a fabric ring expanding device, a fabric ring projecting device, a fabric lateral registering device, a core supporting device, skirt holding back and die stitching devices, a fabric stitching wheel and means for operating the several devices in performing the functions of taking roll fabric and forming it onto a core in the art of making the casings.

2. In a tire carcass forming machine, a fabric strip feeding device adapted to deliver fabric supplied from a stock roll, an intermittent takeup for the fabric supply and a shear interposed between the fabric feed and the intermittent takeup.

3. In a tire forming machine, a fabric strip takeup device, a shear adapted to cut the strip as it passes to the takeup and said shear operated by springs to cut the fabric strip suddenly and not interrupt the movement of the takeup.

4. In a tire forming machine, a winding device to draw fabric strip from a stock strip, a shear located across the path of the strip and adapted to cut the strip by a sudden stroke without interrupting the winding device.

5. In a tire forming machine, a shear for cutting the strip of fabric as it passes from the stock roll on its way to the core, means for operating the shear to cut the fabric strip suddenly without interrupting the travel of the portion that has passed the shear.

6. In a tire forming machine, a shear adapted to cut fabric strip from a stock supply, means for advancing for a short distance the end of the stock supply over the shear blade after each interval of cutting.

7. In a tire carcass forming machine, a source of fabric supply, a winding measuring means for taking the fabric from the source of supply, a shear interposed between the source of supply and the winding measuring means and means controlled by the measuring means for controlling the action of the shear.

8. In a tire carcass forming machine, a source of fabric supply, a winding measuring means for taking the fabric from the source of supply, a shear interposed between the source of supply and the winding measuring means, said shear actuated by springs in the cutting stroke and connections between said winding means and said shear controlling the action of the latter.

9. In a tire carcass forming machine, a source of fabric supply, a winding measuring means for taking the fabric from the source of supply, a shear interposed between the source of supply and the winding measuring means, said shear actuated by springs in the cutting stroke and retreated under the influence of a cam.

10. In a chine of the class described, a stock fabric feeding device, a shear adapted to cut the fabric from the continuous strip, a winding drum adapted to draw the fabric over the shear from the supply furnished by the feeding device, means controlled by the travel of the winding drum to cut the desired length of fabric.

11. In a machine of the class described, a stock fabric feeding device, a shear adapted to cut the fabric from the stock of fabric, as it comes from the feeding device, a winding drum adapted to measure off a definite length of fabric, an actuating mechanism for the shear connected to the drum to operate at a definite point.

12. In a machine of the class described, a shear for cutting a strip of fabric, a mechanism adapted to advance the strip of fabric and form it into a ring, actuating mechanism for the shear connected to the said mechanism and timed in relation thereto to cut a definite length of fabric to fit the length required to form the ring at any definite instance.

13. In a machine of the class described, a shear for cutting off the fabric, a winding and measuring device adapted to draw the fabric over the shear blade and measure off a definite length of fabric, a timing device for the shear in connection with the winding and measuring device.

14. In a machine of the class described, a drum adapted to receive on its periphery a length of fabric in ring form for a layer of a tire carcass, means for expanding the fabric from the drum and applying it to a core.

15. In a carcass forming machine, a means for forming a ring of tire material, and means for applying the completed ring to the core.

16. In a carcass forming machine, a core, a device for measuring and forming a ring of fabric to fit the core, means for stretching and while stretched applying the measured ring of fabric to the core.

17. In a carcass forming machine, a core, a measuring device adapted to measure a given length of fabric to fit the core, means for applying the measured fabric to the core, with stitching means for smoothing out the fabric on the core.

18. In a carcass forming machine, a measuring device for lengths of fabric, a core, means for transferring the fabric from the measuring device to the core, and means for stitching it down to the core.

19. In a carcass forming machine, a core, a measuring means for strips of fabric, means for forming the measured fabric strip into a ring or band, means for stretching the ring or band and means for transferring the stretched band to the core, means for registering the band on the core, with means for stitching the band or ring to the core.

20. In a tire shoe forming machine, a core, a measuring means for a strip of fabric, means for forming the measured strip into a band, means for stretching the band uniformly throughout the periphery of the band, means for applying the stretched band to the core.

21. In a tire carcass forming machine, a core, means for stretching a band of fabric uniformly throughout its periphery, with means for applying the stretched band to the core.

22. In a tire carcass machine, a core, means for applying a previously formed band of fabric to the core, with means for stitching the band of fabric to the core.

23. In a tire carcass forming machine, a core, means for stretching a previously formed band of fabric uniformly throughout its periphery, means for applying the stretched band to the core, means for registering the band centrally on the core, means for stitching the band to the core.

24. In a tire carcass forming machine, a core, means for stretching a previously formed band of fabric uniformly throughout its periphery, means for applying the stretched band to the core, means for registering the band centrally on the core, means for stitching the band to the core simultaneously all around the core.

25. In a tire carcass forming machine, a core, a measuring drum for rings of fabric, with means for transferring a band of fabric from the measuring drum to the core.

26. In a tire making machine, a cylindrical drum on which tire material may be formed in a ring, a tire form, and means for removing the material from the drum and placing it about the tire form.

27. In a tire carcass machine means, a core, a form adapted to hold a ring or band of fabric in normal repose without stretching tension, means for transferring the fabric band from the form to the core and stretching the band during the transfer.

28. In a tire making machine, a cylindrical drum on which tire material may be formed into a ring, a tire form, and means for lifting the ring away from the drum about its entire circumference and placing it about the tire form.

29. In a tire carcass machine, a core, a form adapted to hold a ring or band of fabric in normal repose without stretching tension, means for transferring the fabric band from the form to the core and stretching the band during the transfer; with means for stitching the band of fabric to the core, said stitching means operating on both skirts of the fabric and all around the core simultaneously.

30. In a carcass forming machine, a core, a form or drum upon which is placed a fabric ring without material stretch of the fabric, means for expanding the ring of fabric from the form and then moving it bodily over the core, means for registering the fabric ring on the center line of the rim of the core and means for stitching down the fabric to the core.

31. In a tire casing machine, a core, a form smaller in diameter than the core adapted to hold and carry a band of tire material, means lying within the form for expanding the ring held thereon to a size suitable for application to the core.

32. In a carcass forming machine, a core, a form or drum upon which is placed a fabric ring without material stretch, means for expanding the ring from the form, means for registering the ring on the center lines of the ring and the core and means for shaping the material to the core; with means for moving the ring into position over the core.

33. In a carcass forming machine, a core, a form or drum upon which is placed a fabric ring without material stretch of the fabric, means for expanding the ring of fabric from the form, means for registering the fabric ring on the center lines of the ring and the core, means for stitching down the fabric to the core; and means for moving the band into position over the core.

34. In a carcass forming machine, a core, a form or drum upon which is placed a fabric ring without material stretch of the fabric, means for expanding the ring of fabric from the form, means for registering the fabric ring on the center lines of the ring and the core; means for moving the band into position over the core and means for stitching the fabric band to the core said stitching means acting on the fabric on the core on the entire periphery simultaneously.

35. In a carcass forming machine, a core, a winding drum or form adapted to receive and measure off a band of fabric the right length for application to the core, an expanding means mounted within the form and composed of a series of rods and cam bars, said rods adapted to be expanded by the cam bars and carry the fabric band on the ends of the bars, means for moving the rods with the band of fabric thereon to position encircling the core, means for holding the fabric in position over the core while the rods are withdrawn.

36. In a carcass forming machine, a core, a form adapted to receive a band of cloth the right size for application to the core, expanding means for expanding the band of fabric from the form, said expanding means composed in part of a series of rods arranged in slots in the form and adapted to slide and carry with them the fabric band from the form to and over the core.

37. In a carcass forming machine, a core, a form adapted to receive a band of tire material the right size for application to the core, expanding means for expanding the band of material from the form, said expanding means composed in part of a series of rods arranged in slots in the form and adapted to slide and carry with them the band from the form to and over the core, gripping means for securing the band in position over the core while the rods are withdrawn.

38. In a carcass forming machine, a core on which the tire is vulcanized, a form adapted to receive a band of cloth the right size for application to the core, expanding means for expanding the band of fabric from the form, said expanding means composed in part of a series of rods arranged in slots in the form and adapted to slide and carry with them the fabric band from the form to and over the core, gripping means for securing the band of fabric in position over the core while the rods are withdrawn; with means for stitching the fabric ring to the core.

39. In a carcass forming machine, a core on which the tire is vulcanized, a form adapted to receive a band of cloth the right size for application to the core, expanding means for expanding the band of fabric from the form, said expanding means composed in part of a series of rods arranged in slots in the form and adapted to slide and carry with them the fabric band from the form to and over the core, gripping means for securing the band of fabric in position over the core while the rods are withdrawn with means for stitching the fabric ring to the core and pressing the sides of the fabric to the core with dies.

40. In a carcass forming machine, a core, a form adapted to receive a band of cloth the right size for application to the core, expanding means for expanding the band of fabric from the form, said expanding means composed in part of a series of rods arranged in slots in the form and adapted to slide and carry with them the fabric band from the form to and over the core, gripping means for securing the band of fabric in position over the core while the rods are withdrawn; with means for stitching the fabric ring to the core, and dies for pressing the sides of the fabric to the core.

41. In a machine of the class described, a form adapted to carry a band of fabric suitable for a ply of a casing carcass, an expanding mechanism located within the form adapted to expand the band of fabric off of the form, operating mechanism for the expanding mechanism adapted to move parallel with the axis of the form in operating the expanding mechanism.

42. In a machine of the class described, a form adapted to carry a band of fabric on its periphery of suitable size to apply on a core in forming a carcass, an expanding mechanism adapted to expand the band of fabric from the core, said expanding mechanism composed of a series of cam bars hinged at one end and co-acting with a series of rollers arranged on the ends of a series of push rods and mounted to run in tracks in grooves arranged around the form, said push rods connected to a ring adapted to move to and from the form in actuating the expanding cam bars; a set of carrying rods for the fabric hinged at one end to a ring also adapted to move to and from the form and with the other ends of the carrying rods engaged by said cam bars and adapted to be expanded outward carry the fabric thereon; with means for moving said rings which carry the push rods and means for moving the ring to which the carrying rods are attached in a manner to actuate the parts as described.

43. In a machine of the class described, a revolvable form or drum adapted to carry a band of fabric, a movable ring mounted on the axis of the drum and adapted to move along the axis to and from the drum, a series of expanding devices mounte around the periphery of the drum and connected to the ring and adapted to be actuated by the movement of the ring to expand the fabric band from the drum.

44. In a machine of the class described, a revolvable drum mounted to revolve and wind upon itself a band of fabric two rings mounted to revolve on the same axial line as the drum and be moved along said axial line to and from the drum, a set of expanding members mounted to revolve with the drum and adapted to expand a ring of fabric on the drum, one of said rings connected to said expanding members and adapted to actuate them by the movement of the ring, a set of carrier bars connected to the other of said rings and adapted to carry the band of fabric from the drum by the movement of the said ring to which they are connected.

45. In a tire carcass machine, a revolving drum or form adapted to measure a strip of fabric by winding it on its periphery, a core, on which the fabric is to be placed, a series of rods mounted to revolve with the drum or form and adapted to be moved along the axis of the drum and carry the fabric from the drum or form to a core to which the fabric is to be applied.

46. In a tire carcass machine, a revolving form adapted to measure on its periphery a strip of fabric, a core to which the fabric is to be applied, a series of rods mounted around the periphery of the form and parallel with its axis and adapted to carry the fabric from the form to the core, with means for moving the rods from the form to the core.

47. In a machine of the class described, a core, a form for holding a band of fabric, means for transferring the band of fabric from the form to the core, said means operated through a cylinder and piston operated by compressed fluid.

48. In a machine of the class described, a core, a form adapted to hold a band of fabric, means operated by compressed fluid for expanding the fabric from the form, means operated by compressed fluid for moving the fabric band from the region of the form to the core.

49. In a machine of the class described, a core, a form adapted to hold a band of fabric, means operated by compressed fluid for expanding the fabric from the form, means operated by compressed fluid for moving the fabric band from the region of the form to the core, means operated by compressed fluid for gripping the fabric band and registering it on the core 50. In a machine of the class described, a core, a form adapted to hold a band of fabric ready for application to the core, means for transferring the band of fabric to the core, gripping means for assisting in the registering of the fabric to the core and composed of a series of cylinders carrying pistons operated by compressed fluid and connected to actuate jaws that grip the fabric.

51. In a machine of the class described, a core, a revolving form adapted to measure a band of fabric by winding the fabric on its periphery, a shear, a continuously moving shaft, a cam wheel connected by suitable gearing to revolve with the form and also connected to the shear whereby the cam surface times the operation of the shear, a clutch adapted to engage the cam wheel to be driven from the continuously moving shaft and thus drive the form also.

52. In a machine of the class described, a core, a form for holding a band of fabric lying alongside the core and adapted to hold the band of fabric concentric with the core, said form provided with a series of slots adapted to hold expanding devices for the fabric on the form; with means located within the slots for expanding the band of fabric and placing it over the core.

53. In a machine of the class described, a core, a series of gripping jaws or gripping fingers located around the periphery of the said core, and on one side thereof, a series of carrying devices on the other side of the said core and adapted to carry a band of fabric over the core and into the embrace of the said gripping fingers or jaws.

54. In a machine of the class described, a core, a series of gripping jaws or gripping fingers located around the periphery of the said core, and on one side thereof, a series of carrying devices on the other side of the said core and adapted to carry a band of fabric over the core and into the embrace of the said gripping fingers or jaws and said gripping fingers adapted to slide to and from the core to aid in the registry of the fabric on the core.

55. In a machine of the class described, a core, a set of gripping fingers located around the periphery of the core, means for projecting a band of fabric sidewise over the core and into the embrace of the said gripping fingers whereby the registry of the fabric on the core is secured.

56. In a machine of the class described, a core, a series of gripping fingers located around the periphery of the core and adjustable as to varying diameter of the cores used and adjustable as to the widths of fabric used and provided with jaws adapted to grip and hold the fabric in position on the core.

57. In a machine of the class described, a stitching wheel composed of a set of stitching fingers adapted to encircle a core on both sides thereof and stitch down the fabric simultaneously around the entire core.

58. In a tire carcass forming machine, a stitching wheel provided with radially moving stitching fingers encircling the core and acting on the entire periphery simultaneously.

59. In a carcass forming machine, a core, a stitching wheel encircling the core, and provided with a series of radially moving stitching devices adapted to operate on the periphery of the core simultaneously.

60. In a machine of the class described, a core, a stitching wheel adapted to stitch the fabric to the core progressively on both sides and all around simultaneously.

61. In a device of the class described, stitching fingers arranged in a wheel around the entire periphery of the core.

62. In a device of the class described, a core, stitching fingers connected up to each other and arranged in a system encircling the core.

63. In a device of the class described, a core, stitching fingers arranged in a ring around the core and connected to each other and adapted to operate on the core from the tread toward the beads simultaneously.

64. In a device of the class described, stitching fingers arranged on both sides of a core and in sets and operated to reciprocate to and from the core through the medium of fluid operated cylinders.

65. In a carcass forming machine, a set of stitching fingers one on each side of the core, a cross head to which the fingers are hinged, a piston and cylinder for operating the cross head by fluid pressure in the cylinders.

66. In a carcass forming machine, a series of stitching fingers arranged in sets, around a core in radial alignment and connected to operate together in radial movement, a series of spiral springs arranged in the ends of the stitching fingers and adapted to bridge the gaps from finger to finger.

67. In a carcass forming machine, a ring frame work encircling a core, a series of cylinders mounted in the frame work, a series of cross heads mounted in the frame work and adapted to operate radially, a series of pistons mounted in the cylinders and connected to the cross heads, a series of stitching fingers connected to the cross heads and operated thereby.

68. In a carcass forming machine, a ring frame work encircling a core, a series of cylinders mounted in the frame work, a series of cross heads mounted in the frame work and adapted to operate radially, a series of pistons mounted in the cylinders and connected to the cross heads, a series of stitching fingers connected to the cross heads and operated thereby, with a series of springs for holding the fingers into contact with the core.

69. In a carcass forming machine, a ring frame work encircling a core, a series of cylinders mounted in the frame work, a series of cross heads mounted in the frame work and adapted to operate radially, a series of pistons mounted in the cylinders and connected to the cross heads, a series of stitching fingers connected to the cross heads, and operated thereby, with a series of springs for holding the fingers into contact with the core, and a series of coil springs connecting the ends of the stitching fingers.

70. In a machine of the class described, a series of stitching fingers arranged in a ring adjacent to each other, with a series of coil springs connecting the ends of the fingers.

71. In a machine of the class described, a series of stitching fingers arranged adjacent to each other and adapted to contract toward the center of the core to draw the skirts of the fabric down around the core.

72. In a carcass forming machine, a stitching finger, composed of a shank or stem having a rounded end or nose in contact with the fabric and arranged to support a small coil spring on each side of the end, the said spring acting as an elastic extension of the ends of the finger along the periphery of the stitching line.

73. In a machine of the class described, stitching fingers arranged in sets, a cross head to which the fingers are connected and actuated, spiral extension springs connected across to draw the fingers into contact with the core and to aid in the retreat of the cross head and fingers.

74. In a machine of the class described, a ring frame work, a series of fluid actuated cylinders and pistons arranged radially around the ring frame, a series of cross heads arranged to slide radially in the ring frame, a series of stitching fingers mounted on the cross heads and moved thereby; with means for causing the stitching fingers to follow the radial shape of the core.

75. In a machine of the class described, a ring frame work, a series of fluid actuated cylinders and pistons arranged radially around the ring frame, a series of cross heads arranged to slide radially in the ring frame, a series of stitching fingers mounted on the cross heads and moved thereby; with means for causing the stitching fingers to follow the radial shape of the core, and with holdback dies adapted to hold back the skirts of the fabric during the stitching.

76. In machine of the class described, a ring frame work, a series of fluid actuated cylinders and pistons arranged radially around the ring frame, a series of cross heads arranged to slide radially in the ring frame, a series of stitching fingers mounted on the cross heads and moved thereby; with means for causing the stitching fingers to follow the radial shape of the core, and with holdback dies adapted to hold back the skirts of the fabric during the stitching, and adapted to act as dies to compress the fabric to the core.

77. In a machine of the class described, means for stitching down the fabric to the core in combination with elastic faced dies adapted to compress the fabric after the stitching operation.

78. In a machine of the class described, means for stitching fabric to the core in combination with a set of dies co-acting on opposite sides of the core to compress the several layers together and to each other.

79. In a machine of the class described, means for forming fabric to a core, composed of devices adapted to form the fabric over the core; with dies adapted to press and finally shape the fabric on the core.

80. In a machine of the class described, means for forming fabric to a core, composed of devices adapted to form the fabric over the core, with dies adapted to press and finally shape the fabric on the core, said dies having elastic faces.

81. In a machine of the class described, means for forming fabric radially about a core; with means for pressing the fabric laterally on the core, said lateral pressing means having elastic faced dies.

82. In a carcass forming machine, means for applying fabric to a core, means for forming the fabric radially around the core section and means for pressing the fabric laterally to the core, composed of dies approximately the contour of the core.

83. In a carcass forming machine, means for applying fabric to a core, means for forming the fabric radially around the core section and means for pressing the fabric laterally to the core, composed of elastic faced dies approximately the contour of the core.

84. In a carcass forming machine, means for applying fabric to a core, means for forming the fabric around the core section, means for holding back the skirts of the fabric while the forming is being accomplished; with means for pressing the fabric laterally to the core.

85. In a carcass forming machine, means for applying fabric to a core, means for forming the fabric around the core section, means for holding back the skirts of the fabric while the forming is being accomplished; with means for pressing the fabric laterally to the core, which pressing means is composed of dies.

86. In a carcass forming machine, means for applying fabric to a core, means for forming the fabric around the core section, means for holding back the skirts of the fabric while the forming is being accomplished; with means for pressing the fabric laterally to the core, which pressing means is composed of dies having elastic faces.

87. In a carcass forming machine, means for applying fabric to a core, means for shaping the skirts of the fabric down upon the sides of the core and said shaping means composed of stricturing devices operating radially of the core.

88. In a carcass forming machine, means for applying fabric to a core, means for shaping the skirts of the fabric down upon the sides of the core and said shaping means composed of stricturing devices operating radially of the core, with holdback means for the skirts of the fabric during the shaping of those parts to the core.

89. In a carcass forming machine, means for applying fabric to a core, means for shaping the skirts of the fabric down upon the sides of the core and said shaping means composed of stricturing devices operating radially of the core, with holdback means for the skirts of the fabric during the shaping of those parts to the core, said holdback means in the form of dies approximately the outline of the core surface at the skirt portions.

90. In a carcass forming machine, means for applying fabric to a core, means for stitching fabric to a core while the core is at rest, with holdback means for holding back the skirts of the fabric during the stitching.

91. In a carcass forming machine, means for applying fabric to a core, means for stitching fabric to a core while the core is at rest, with holdback means for holding back the skirts of the fabric during the stitching and composed of ring shaped dies having approximate outlines to that of the surfaces of the core where the skirts are applied.

92. In a tire forming machine, a core, and means for shaping tire material to the core, comprising a device for retarding the skirts of the material and a forming tool adapted to enter the bight of the material and to progress toward the center of the core, said forming means contracting within itself as it approaches the center of the core.

93. In a carcass forming machine, means for applying fabric to a core, means for shaping the fabric to the sides of the core while the core is at rest, means for holding back the skirts of the fabric during the shaping, said holding back means in the form of die rings positioned on the sides of the core.

94. In a carcass forming machine, means for applying fabric to a core, means for shaping the fabric to the sides of the core while the core is at rest, means for holding back the skirts of the fabric during the shaping, said holding back means in the form of die rings positioned on the sides of the core, and faced with elastic material.

95. In a carcass forming machine, means for applying fabric to a core, means for shaping the fabric to the sides of the core while the core is at rest, means for holding back the skirts of the fabric during the shaping, said holding back means in the form of die rings positioned on the sides of the core, and faced with elastic material and shaped approximately to fit the sides of the core at the skirt positions of the fabric.

96. In a carcass forming machine, means for applying fabric to a core, means for shaping the fabric to the sides of the core while the core is at rest, means for holding back the skirts of the fabric during the shaping, said holding back means in the form of die rings positioned on the sides of the core, and faced with elastic material and shaped approximately to fit the sides of the core at the skirt positions of the fabric, and means to move the dies toward and away from the sides of the core.

97. In a carcass forming machine, means for applying fabric to a core, means for shaping the fabric to the sides of the core while the core is at rest, means for holding back the skirts of the fabric during the shaping, said holding back means in the form of die rings positioned on the sides of the core, and faced with elastic material and shaped approximately to fit the sides of the core at the skirt positions of the fabric, and adapted to act as dies in pressing the fabric to the sides of the core, together with means for forcing the said die holdback means against the sides of the core.

98. In a machine of the class described, a stitching forming means for forming fabric to the sides of a stationary core, dies adapted to act as holdbacks for the skirt of the fabric and also to serve as dies to assist in securing the fabric to the core.

99. In a machine of the class described, a stitching forming means for forming fabric to the sides of a stationary core, dies adapted to act as holdbacks for the skirt of the fabric and also to serve as dies to assist in securing the fabric to the core, and provided with elastic faces.

100. In a machine of the class described, a stitching forming means for forming fabric to the sides of a stationary core, dies adapted to act as holdbacks for the skirt of the fabric and also to serve as dies to assist in securing the fabric to the core, and provided with elastic faces, and with means for adjusting the dies in position to act as holdbacks for the skirts and to press the dies to contact with the fabric on the core.

101. In a machine of the class described, a stitching mechanism composed of stricturing devices that draw the skirts of the fabric down around the core, with compression dies that press the fabric laterally to the core.

102. In a machine of the class described, a stitching mechanism composed of stricturing devices that draw the skirts of the fabric down around the core, with compression dies that press the fabric laterally to the core, said dies provided with elastic faces.

103. In a machine of the class described, a stitching mechanism composed of stricturing devices that draw the skirts of the fabric down around the core, with compression dies that press the fabric laterally to the core, and also act as holdbacks for the skirts of the fabric.

104. In a machine of the class described, a stitching mechanism composed of stricturing devices that draw the skirts of the fabric down around the core, with compression dies that press the fabric laterally to the core, said dies provided with elastic faces and adapted to act as holdbacks for the skirts of the fabric.

105. In a carcass forming machine, a stitching means composed of stricturing devices adapted to draw in the skirts of a layer of fabric and place them down the sides of a core, means in the form of dies for smoothing out the fabric on the core; with means in the form of fluid operated pistons and cylinders for operating the dies.

106. In a carcass forming machine, stricture devices for drawing in the skirts of the fabric and forming them down the sides of the core, holdback dies adapted to hold back the skirts of the fabric as it is operated on by the stricture devices, and said dies adapted to act as pressing dies in stitching the skirts of the fabric to the sides of the core; with cylinders and pistons for operating the dies by fluid pressure and adjustable stops adapted to regulate the movement of the pistons carrying the dies.

107. In a machine of the class described, a core, means for applying fabric to the core, means for forming the fabric down on the sides of the core; with means for pressing the fabric to the core on the sides thereof and said compressing mechanism composed of a plurality of circular dies operating progressively to carry sections of fabric to the core one after the other.

108. In a machine of the class described, a core, means for applying fabric to the core, means for forming the fabric down on the sides of the core; with means for pressing the fabric to the core on the sides thereof and said compressing mechanism composed of a plurality of circular dies operating progressively to carry sections of fabric to the core one after the other and said dies operated by pistons and cylinders actuated by fluid pressure.

109. In a machine of the class described, means for forming fabric down the sides of a core, and means in the form of rings for pressing the fabric to the sides of the core, said rings arranged in series one within the other.

110. In a machine of the class described, means for forming fabric down the sides of a core, and means in the form of rings for pressing the fabric to the sides of the core, said rings arranged in series one within the other with means for actuating the rings progressively.

111. In a machine of the class described, means for forming fabric down the sides of a core, and means in the form of rings for pressing the fabric to the sides of the core, said rings arranged in series one within the other; with means for actuating the rings progressively, composed of fluid actuated pistons and cylinders.

112. In a machine of the class described, means for forming fabric down the sides of a core and means in the form of a plurality of die rings of varying diameters for pressing the fabric sidewise to the core, and said die rings acting as holdbacks to the skirts of the fabric during the forming of the fabric on the sides of the core.

113. In a machine of the class described, means for forming fabric down the sides of a core and means in the form of a plurality of die rings of varying diameters for pressing the fabric sidewise to the core, and said die rings acting as holdbacks to the skirts of the fabric during the forming of the fabric on the sides of the core, with adjustable stops for timing the movement of the die rings.

114. In a machine of the class described, a core, a die ring adapted to fit approximately the shape of the side of the core and means for forcing the die ring to the core and said die ring having an elastic face.

115. In a machine of the class described, a core, a series of ring dies of varying diameters having faces approximately the shape of the side of the core adjacent to them and stops arranged to regulate the movement of the dies in relation to each other and the core.

116. In a machine of the class described, a core, a series of ring dies one within the other and shaped to fit approximately the sides of the core adjacent to them, the faces of some of the dies being elastic to accommodate the splices in the fabric and the varying thickness of the fabric.

117. In a machine of the class described, a core, a series of ring dies of varying diameters, means for operating the larger diameter dies to press the sides of the core in advance of the same action by the smaller diameter dies.

118. In a machine for applying fabric to a core, a series of stitching fingers radially arranged in a ring frame around a core and composed of contact ends connected to arms hinged to crossheads mounted in the ring frame, a series of cam rollers mounted on arms connected to the stitching finger arms and adapted to guide the stitching finger ends; with a series of cam tracks radially arranged and adapted to engage the cam rollers on the arms and guide the stitching finger ends in relation to the core sides.

119. In a machine of the class described, a series of stitching fingers arranged around a core in circular form and adapted to move radially to and from the core periphery, a series of cam tracks arranged in circular form and in alignment with the movement of the stitching fingers and adapted to engage and guide the fingers in proper contact with the sides of the core.

120. In a machine for stitching fabric to a core in forming a tire carcass, a radially moving non-rotating stitcher finger combined with a cam guide adapted to control the movement of the finger over the contour of the core section.

121. In a machine for stitching fabric to a core in forming a tire carcass, a plurality of stitching fingers arranged about the circumference and adapted to embrace a core section and hinged to a common cross head and adapted to reciprocate radially in relation to the core combined with cam tracks adapted to engage and guide the ends of the stitching fingers relative to the core section.

122. In a machine for stitching fabric to a core, a series of stitching fingers arranged to embrace a core section and reciprocate radially in relation thereto, a series of cam tracks arranged to guide the ends of the stitching fingers relative to the core sides; with means for moving the cam tracks to and from the sides of the core.

123. In a machine for stitching fabric to a core, a series of stitching fingers arranged to embrace a core section and reciprocate radially in relation thereto, a series of cam tracks arranged to guide the ends of the stitching fingers relative to the core sides; with means for moving the cam tracks to and from the sides of the core and arranged to produce contact with the fabric on the inward work stroke and release the fingers from the fabric on the retreat stroke.

124. In a machine for stitching fabric to a ring core, stitching fingers arranged in pairs to embrace a core, guide cam tracks for the fingers arranged to guide the fingers in contact with the fabric on the work stroke and to hold the fingers free from the fabric on the retreat stroke.

125. In a machine for stitching fabric to a core, a series of stitching devices arranged radially around a ring frame forming a complete set around the periphery of a core, means for reciprocating simultaneously the entire set of fingers, guide cam tracks adapted to guide the fingers in contact with the fabric on the core on the work stroke and to hold them free on the return or retreat stroke.

126. In a machine for stitching fabric to a core, stitching fingers adapted to move radially to the core in stitching fabric to the core, guide cam tracks for the stitching fingers adapted to reciprocate or move laterally to and from the core.

127. In a machine for stitching fabric to a core, stitching fingers adapted to move radially to the core in stitching fabric to a core, guide cam tracks for the stitching fingers adapted to reciprocate or move laterally to and from the core, and provided with adjusting stops to regulate the movement of the guide cam tracks.

128. In a machine for stitching fabric to a core, a series of stitching fingers arranged in a ring frame in radial alignment and normally outside and clear of a core upon which a carcass is built, means mounted on the ring frame for reciprocating the stitching fingers to and from the core and the fabric to be applied thereto, guide cam tracks for guiding the fingers in relation to the core sides and mounted around the periphery of the core and adjacent thereto and adapted to engage and guide the fingers on the sides of the core.

129. In a machine for stitching fabric in forming a tire carcass, a series of stitching fingers arranged to reciprocate radially to and from the periphery of a core, cam guide tracks for the fingers in relation to the core composed of two stages or steps, one stage carrying the fingers to the bead location and the second step carrying the fingers beyond the beads.

130. In a machine for stitching fabric in forming a tire carcass, a series of stitching devices adapted to converge radially on the core at all sides and form the fabric on the carcass down to the bead location; with secondary stitching devices moving laterally to the core and adapted to stitch the fabric under the beads.

131. In a machine for applying fabric to a core in forming a tire carcass, means for forming the fabric skirts down the sides of the core in combination with plural stage means for pressing the fabric to the core sides, together with holdback means for holding back the outer ends of the fabric skirts during the entire forming operation.

132. In a tire carcass forming machine, means for applying fabric to a core, means for forming the fabric down the sides of the core in combination with a plural series of concentric dies adapted to press the fabric laterally to the core sides.

133. In a tire carcass forming machine, means for forming fabric radially down the sides of the carcass and over the beads, with lateral moving rings adapted to form the fabric under the beads.

134. In a tire carcass forming machine, means for forming fabric radially down the sides of the carcass and over the beads, with lateral moving rings adapted to form the fabric under the core, together with holdback rings of smaller diameter than the lateral moving rings and adapted to hold back the margins of the fabric as they are formed under the beads.

135. In a machine for forming tire casing carcasses, means for stitching fabric under the bead portions composed of a movable stitching ring mounted to move laterally in relation to the core and shaped to press the fabric to the under-side of the bead.

136. In a machine for forming tire casing carcasses, means for stitching fabric under the bead portions composed of a movable stitching ring mounted to move laterally in relation to the core and shaped to press the fabric to the under-side of the bead, in combination with a stationary holdback ring smaller in diameter than the stitching ring and adapted to hold the margins of the fabric back as they are drawn over the outside of the holdback ring by the stitching ring.

137. In a machine for forming tire casing carcasses, means for forming the fabric over and under the bead composed of a die ring shaped on the outside to fit approximately to the under side of the bead, a holdback ring slightly smaller than the inside of the die ring and over which the fabric is drawn by the movement of the die ring in the act of stitching.

138. In a machine for forming tire casing carcasses, means for forming the fabric over and under the bead composed of a die ring shaped on the outside to fit approximately to the under side of the bead, a holdback ring slightly smaller than the inside of the die ring and over which the fabric is drawn by the movement of the die ring in the act of stitching, with a clamping ring adapted to clamp the edge of the fabric against the holdback ring.

139. In a machine for forming tire casing carcasses, means for forming the fabric over and under the bead composed of a die ring shaped on the outside to fit approximately to the under side of the bead, a holdback ring slightly smaller than the inside of the die ring and over which the fabric is drawn by the movement of the die ring in the act of stitching, with a clamping ring adapted to clamp the edge of the fabric against the holdback ring, and said clamping ring connected to the said die ring.

140. In a machine for forming tire casing carcasses, means for stitching fabric under the bead composed of a ring die and holding back devices, the latter clamping the edge of the fabric in an elastic manner.

141. In a machine for forming tire casing carcasses, means for stitching fabric under the beads, composed of means for forming the skirts of the fabric below the beads, means for clamping the skirts on their edges below the beads and means for drawing the skirts under tension from the clamps and stitching it under the beads.

142. In a tire casing carcass forming machine, a stitching mechanism for forming the fabric down to and beyond the beads, said stitching mechanism composed of stricturing devices controlled by cam tracks in relation to the pressure on the sides of the carcass, and said cam tracks divided into two stages independently movable as relates to each other.

143. In a tire casing carcass forming machine, a stitching mechanism for forming the fabric down to and beyond the beads, said stitching mechanism composed of stricturing devices controlled by cam tracks in relation to the pressure on the sides of the carcass, and said cam tracks divided into two stages independently movable as relates to each other, and moved to and from the sides of the core or carcass, by pistons and cylinders fluid operated.

144. In a tire casing carcass forming machine, means for forming and applying fabric to a core composed of means for winding fabric from a reel of supply fabric to the desired length, stitching means composed of stricturing devices that encircle the entire core and operate simultaneously around the core, a movable carriage adapted to carry and support the core within the stitching means and move laterally to and from the said stitching means.

145. In a tire casing forming machine, a stitching wheel, a movable carriage mounted to move to and from the stitching wheel along the axis thereof and adapted to support a core upon which the carcass is formed.

146. In a tire casing forming machine, a stitching wheel, a movable carriage mounted to move to and from the stitching wheel along the axis thereof and adapted to support a core upon which the carcass is formed, with means carried by the carriage for locking the core to the carriage.

147. In a carcass forming machine, a stitching wheel, a carriage mounted alongside the wheel and adapted to move to and from the wheel along the line of the axis of the wheel, a core carried by the carriage and mounted to be moved along the axis of the core and wheel in relation to the carriage.

148. In a carcass forming machine, a stitching wheel, a movable carriage or frame mounted at the side of the wheel and adapted to move to and from the wheel along the axis of the wheel, a core carrying spider mounted on a shaft in the axis of the carriage and wheel, and said shaft and spider adapted to slide lengthwise along said axis.

149. In a carcass forming machine, a stitching wheel, a movable carriage frame mounted adjacent to the wheel and adapted to move to and from the wheel along the axis thereof, a core supporting shaft mounted in the axis of the carriage and wheel, with a holdback die also mounted on a shaft in the said carriage and carried thereby in proximity to the core.

150. In a carcass forming machine, a stitching wheel, a movable carriage frame mounted adjacent to the wheel and adapted to move to and from the wheel along the axis thereof, a core supporting shaft mounted in the axis of the carriage and wheel, with a holdback die also mounted on a shaft in the said carriage and carried thereby in proximity to the core, and with a series of cam tracks in radial form mounted in relation to the holdback die.

151. In a tire casing carcass machine, a stitching means, a movable frame or carriage mounted to be moved to and from the stitching means along the axis of the carcass being formed, said frame carrying core supporting means and holdback and stitching die rings.

152. In a tire casing carcass machine, a stitching means, a movable frame or carriage mounted to be moved to and from the stitching means along the axis of the carcass being formed, said frame carrying core supporting means and holdback and stitching die rings and cam track rings, and gripping means for aiding in the registry of the fabric.

153. In a carcass forming machine, a stitching wheel; a movable frame, means to move said frame to and from the wheel along the axis of the wheel and carry a core, a stitching die and means for operating the said die.

154. In a carcass forming machine, a stitching wheel; a movable frame, means to move said frame along the axis of the wheel and carry a core, a stitching and holdback die and fluid operated cylinders for actuating the die.

155. In a carcass forming machine, a stitching wheel; a movable frame, means to move said frame along the axis of the wheel and carry a core, a stitching die, means for operating the said die; with means for locking the frame in position to the said wheel.

156. In a carcass forming machine, a stitching wheel; a movable frame, means to move said frame along the axis of the wheel and carry a core, and plural set of stitching dies arranged concentrically one within the other and concentric with the axis of the wheel.

157. In a carcass forming machine, a stitching wheel; a movable frame, means to move said frame to and from the wheel along the axis thereof and carry a core, gripping fingers for the fabric and means for operating the gripping fingers.

158. In a carcass forming machine, a stitching wheel; a movable frame, means to move said frame to and from the wheel along the axis thereof and carry a core, gripping fingers for the fabric and means for operating the gripping fingers, and said gripping fingers adjustable both horizontally and radially relative to the core.

159. In a carcass forming machine, a stitching wheel; a movable frame, means to move said frame to and from the wheel along the axis thereof and carry a core, gripping fingers for the fabric and means for operating the gripping fingers, and said gripping fingers adjustable both horizontally and radially relative to the core, and operated by fluid pressure cylinders.

160. In a carcass forming machine, a stitching wheel; a movable carriage or frame on one side of the wheel, means to move said frame to and from the wheel and carry a core and stitching die, with means for locking the said frame in relation to the said stitching wheel; with a stitching die mounted in the fixed frame on the other side of said wheel and means for operating the said dies simultaneously.

161. In a carcass forming machine, a core supporting means, stitching dies mounted concentric with the core and coextensive therewith, with means for pressing the dies to the core sides.

162. In a carcass forming machine, a core supporting means, stitching dies mounted concentric with the core and coextensive therewith, with means for pressing the dies to the core sides, said pressing means composed of fluid actuated cylinders and pistons.

163. In a carcass forming machine, a set of stitching dies adapted to register concentrically with a core or carcass body and on each side thereof, and encircling said core or carcass, means for moving the dies asunder to permit the entrance of a core or carcass body between them; with means for pressing the dies and carcass together sidewise.

164. In a carcass forming machine, a set of stitching dies adapted to register concentrically with a core or carcass body and on each side thereof and encircling said core or carcass, means for moving the dies asunder to permit the entrance of a core or carcass body between them; with means for pressing the dies and carcass together sidewise, said pressing means fluid operated.

165. In a carcass forming machine, plural concentric dies, one within the other in sets arranged on each side of a core or carcass mounting and concentric therewith; with means for pressing the several dies to the carcass sides.

166. In a carcass forming machine, plural concentric dies, one within the other in sets arranged on each side of a core or carcass mounting and concentric therewith; with means for pressing the several dies to the carcass sides, said pressing means arranged to operate the corresponding sets of dies progressively.

167. In a machine of the class described, a core, a spider on which the core is mounted, a shaft on which the said spider is mounted, a hollow shaft into which the spider shaft is mounted, said hollow shaft fixed in position in a frame and supporting a thrust or registering means for the core sides and said spider shaft adapted to slide longitudinally within the hollow shaft.

168. In a tire shoe making machine, a core supporting means mounted on a shaft supported within hollow shafts, lateral thrust supporting means carried by the hollow shafts, side stitching dies carried on secondary hollow shafts outside of the first named shafts.

169. In a tire shoe making machine, a core supporting means mounted on a shaft supported within hollow shafts, lateral thrust supporting means carried by the hollow shafts, side stitching dies carried on secondary hollow shafts outside of the first named shafts and bead stitching means carried by a third set of hollow shafts encircling the other shafts.

170. In a tire machine, a series of concentric stitching dies mounted on hollow shafts, and actuated by pistons and cylinders also mounted on the hollow shafts.

171. In a tire machine, a series of concentric stitching dies mounted on hollow shafts on each side of a core mounting and connected across to be operated simultaneously and in unison.

172. In a tire machine, a core supporting shaft or spindle, stitching dies concentric with the core and mounted on hollow shafts on each side of the core, with registering stops for each set of dies connected across to each other to regulate the registry of the dies in unison.

173. In a machine of the class described, a core, a set of concentric die rings adapted to press the fabric to the sides of the core, with means for supporting the core between the rings and concentric therewith and means for moving the parts to and from each other.

174. In a machine of the class described, a stitching wheel; a circular frame work for the wheel, end frames on each side of the wheel and connected to each other and to the wheel frame, a movable frame mounted in the main frame and on one side of the wheel frame and adapted to move to and from the wheel frame, and carry a core into and out of registry with the stitching wheel.

175. In a machine of the class described, a stitching wheel, a circular frame work for the wheel, end frames on each side of the wheel and connected to each other and to the wheel frame, a movable frame mounted in the main frame and on one side of the wheel frame and adapted to move to and from the wheel frame, and carry a core into and out of registry with the stitching wheel; with dies for pressing the fabric to the sides of the core one of which is located on the same side as the movable frame and is carried thereby.

176. In a machine of the class described, a stitching wheel, a drum located on one side of and concentric with the stitching wheel axis, a movable frame located on the other side of the wheel and adapted to carry a core and move horizontally along the axis of the wheel; with means for transferring fabric from the said drum to the core as carried by the movable frame.

177. In a tire machine, a stitching mechanism, a movable frame adapted to carry a core or form on which the tire is built and movable in relation to the stitching mechanism along the axis line of the core or form, a stationary frame at the opposite side of the stitching mechanism from that of the movable frame, a pressure die on the stationary frame and one on the movable frame, means for operating the pressure dies to press the sides of the core or form and means for locking the movable frame across to the fixed frame.

178. In a tire machine, a drum for holding a band of fabric, means for transferring the band of fabric to a core, means for stitching the fabric band to the core, dies for aiding in the stitching of the fabric to the core, means located within the drum for actuating said dies.

179. In a machine of the class described, a revolving drum adapted to receive a fabric ring preparatory to its placement on a core or form of a tire carcass, a secondary supporting drum upon which the revolving drum is mounted, means supported by the supporting drum for pressing the side of the carcass and located between the end of the revolving drum and the core or form.

180. In a machine of the class described, a revolving drum adapted to receive a fabric ring preparatory to its placement on a core or form of a tire carcass, a secondary supporting drum upon which the revolving drum is mounted, means supported by the supporting drum for pressing the side of the carcass and located between the end of the revolving drum and the core or form, with means located on the interior of the supporting drum for actuating the side pressing means.

181. In a machine of the class described, a core, a shaft for supporting the core, tubular shafts surrounding the first named shaft, and dies for pressing the sides of the core carried on said tubular shafts.

182. In a machine of the class described, concentrically arranged hollow shafts, a series of concentrically arranged dies mounted on said hollow shafts and adapted to press the sides of a core or carcass thereon, a series of cylinders and pistons concentrically arranged on said hollow shafts for actuating the said dies.

183. In a machine of the class described, a stitching wheel frame composed of a series of concentrically arranged rings connected to each other by radial rods, cross heads mounted to reciprocate on the radial rods and adapted to carry stitching devices.

184. In a machine of the class described, a stitching means comprising a series of pads mounted around the periphery of the carcass, with means for pressing the pads against the tread portion of the carcass.

185. In a machine of the class described, a stitching means comprising a series of pads mounted around the periphery of the carcass, with means for pressing the pads against the tread portion of the carcass, said pads having elastic faces.

186. In a machine of the class described, a wheel composed of a series of concentrically arranged rings in two sets connected to each other by bars, pressure cylinders radially arranged within the wheel and supported therein by the said bars.

187. In a machine for manufacturing tire carcasses, the combination of a non-expanding core, means for forming a continuous band of stretched fabric, and means for placing the fabric around the core.

188. In a machine for manufacturing tire carcasses, the combination of a core, means for forming a continuous band of stretched fabric, means for placing the fabric around the core in stretched condition, and means for releasing the fabric.

189. In a machine for manufacturing tire carcasses, the combination of a non-expanding core, means for forming a continuous band of stretched fabric, means for placing the fabric around the core, and a shaping device for forming the fabric to the side of the core.

190. In a machine for manufacturing tire carcasses, the combination of a core, means for forming a continuous band of stretched fabric, means for placing the fabric around the core in stretched condition, means for releasing the fabric, and a shaping device for forming the fabric to the side of the core.

191. In a machine for manufacturing tire carcasses, the combination of a non-expanding core, means for forming continuous band of fabric, means for projecting the fabric on the core, and a shaping device for forming the fabric to the side of the core.

192. In a machine for manufacturing tire carcasses, the combination of a non-rotatable core, a source of fabric supply, means for removing the fabric from the supply and forming it into a ring, and means for applying the ring to the core.

193. In a machine for manufacturing tire carcasses, the combination of a non-rotatable core, a source of fabric supply, means for removing the fabric from the supply and forming it into a ring, and means for expanding the ring and for applying the expanded ring to the core.

194. In a machine for manufacturing tire carcasses, the combination of a core, means for holding the core rigidly, a source of fabric supply, means for taking the fabric from the supply and applying it to the core, means for stretching the fabric on its way from the supply to the core, and means for shaping the fabric to the core.

195. In a machine for manufacturing tire carcasses, the combination of a non-rotatable core, a source of fabric supply, means for removing the fabric from the supply and forming it into a ring, means for applying the ring to the core, means for shaping the fabric to the core.

196. In a machine for manufacturing tire carcasses, the combination of a non-rotatable core, a source of fabric supply, means for removing the fabric from the supply and forming it into a ring, means for expanding the ring and for applying the expanded ring to the core, and means for shaping the fabric to the core.

197. In a machine for forming tires from fabric, a core, means for supplying fabric to the core, with means for shifting the fabric after it is placed around the core for centering it on the core.

198. In a machine for forming tires from fabric, a core, means for supplying fabric to the core in a ring, in combination with shifting means for centering the ring of fabric relative to the core.

199. In a machine for forming tires from fabric, a core, means for forming fabric into a ring, means for expanding the ring and placing it around the core, in combination with shifting means for centering the ring of fabric relative to the core.

200. In a machine for forming tires from fabric, a core, means for supplying fabric to the core laterally, and means for centering the fabric relative to the core.

201. In a machine for forming tires from fabric, a core, means for supplying the fabric to the core laterally, in the form of a ring, and means for shifting the ring to center it around the core.

202. In a machine for forming tires from fabric, a core, means for forming the fabric in a ring, means for expanding the ring, gripping mechanism for holding the ring, said gripping mechanism being mounted to shift the ring into centered position on the core.

203. In a machine for manufacturing tires from fabric, a core, a fabric supply, means for removing the fabric from the supply and placing it around the core, including means to positively shift the fabric into central position on the core.

204. In a machine for manufacturing tires from fabric, a core, a fabric supply, means for removing the fabric from the supply and placing it around the core in stretched condition, including means to grip the edge of the fabric and positively shift it into central position on the core.

205. In a machine for manufacturing tires from fabric, a core, a fabric supply, means for stretching fabric and placing it around the core, including means to grip the edge of the fabric, said gripping means being shiftable to register the fabric centrally of the core.

206. In a machine for manufacturing tires from fabric, a core, means located at one side of the core to supply a ring of stretched fabric to the core, and means at the other side of the core to receive the fabric and remove it from the supplying means.

207. In a machine for manufacturing tires from fabric, a core, means located at one side of the core to supply a ring of stretched fabric to the core, and means at the other side of the core to receive the fabric and remove it from the supplying means with means to center the fabric on the core.

208. In a machine for manufacturing tires from fabric, a core, means located at one side of the core for supplying fabric laterally on the core, and means at the other side of the core to receive the fabric and position it about the core.

209. In a machine for manufacturing tires from fabric, a core, means located at one side of the core for supplying fabric laterally on the core, and means at the other side of the core to receive the fabric and position it about the core, including shifting devices for centering the fabric.

210. In a device for applying the extensible bands to cores in the manufacture of tire casings, means for supporting a core, means for stretching an endless band from a circumference less than to a circumference greater than that of the core at its crest, means for transporting the stretched band to a position encircling the core, and means for releasing the band so that it may contract upon the core.

211. In a device for applying the extensible bands to cores in the manufacture of tire casings, means for supporting a core, means for stretching an endless band from a circumference less than to a circumference greater than that of the core at its crest, means for assembling the band and core with the band encircling the core, and means for releasing the band so that it may contract upon the core.

Signed at Chicago, county of Cook, and State of Illinois, the 24th day of April, 1918.

WILLIAM ERASTUS WILLIAMS.

Witnesses:
  THOMAS LOCKERBIE.
  C. PLUMMER.